United States Patent
Suzuki

(10) Patent No.: US 9,928,013 B2
(45) Date of Patent: Mar. 27, 2018

(54) PRINT CONTROL SYSTEM, METHOD OF CONTROLLING PRINTING, AND RECORDING MEDIUM

(71) Applicant: Shohta Suzuki, Kanagawa (JP)

(72) Inventor: Shohta Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/092,745

(22) Filed: Apr. 7, 2016

(65) Prior Publication Data
US 2016/0224282 A1 Aug. 4, 2016

Related U.S. Application Data

(63) Continuation of application No. 13/632,367, filed on Oct. 1, 2012, now Pat. No. 9,323,482.

(30) Foreign Application Priority Data

Oct. 19, 2011 (JP) .................................. 2011-229742

(51) Int. Cl.
*G06F 3/12* (2006.01)

(52) U.S. Cl.
CPC .......... *G06F 3/1206* (2013.01); *G06F 3/1222* (2013.01); *G06F 3/1247* (2013.01); *G06F 3/1288* (2013.01)

(58) Field of Classification Search
CPC .................................................. G06F 3/1206
USPC ........................................................ 358/1.15
See application file for complete search history.

(56) References Cited

U.S. PATENT DOCUMENTS

| 2002/0080403 | A1* | 6/2002 | Oshima | G06F 3/1204 |
| | | | | 358/1.15 |
| 2005/0206917 | A1 | 9/2005 | Ferlitsch | |
| 2007/0097431 | A1 | 5/2007 | Matsuda et al. | |
| 2011/0242594 | A1* | 10/2011 | Yabe | G06F 3/1211 |
| | | | | 358/1.15 |

(Continued)

FOREIGN PATENT DOCUMENTS

| JP | 2001-290742 | 10/2001 |
| JP | 2003-029947 | 1/2003 |

(Continued)

OTHER PUBLICATIONS

Japanese Office Action dated Sep. 29, 2015.

*Primary Examiner* — Jacky Zheng
(74) *Attorney, Agent, or Firm* — IPUSA, PLLC

(57) ABSTRACT

An output system includes a user terminal including a first processor; an information processing system including one or more second processors; and one or more output apparatuses each including a third processor, wherein the first processor is configured to receive an output request from a user, an output request designating an output target data and an output destination selected from among the one or more output apparatuses, and send, in response to receiving the output request, the output target data to the information processing system and an acquisition request of outputting to the designated output apparatus and wherein the third processor is configured to execute, in response to receiving the acquisition request from the user terminal, an acquisition process to acquire the designated output target data from the information processing system.

13 Claims, 19 Drawing Sheets

(56) References Cited

U.S. PATENT DOCUMENTS

| | | | | |
|---|---|---|---|---|
| 2011/0255128 A1* | 10/2011 | Ozawa | ............... | G06F 3/1203 |
| | | | | 358/1.15 |
| 2012/0033254 A1* | 2/2012 | Numata | ............... | G06F 3/1213 |
| | | | | 358/1.15 |
| 2012/0050795 A1* | 3/2012 | Nakamura | ............ | G06F 3/1207 |
| | | | | 358/1.15 |

FOREIGN PATENT DOCUMENTS

| JP | 2008-305166 | 12/2008 |
|---|---|---|
| JP | 4509965 | 7/2010 |

* cited by examiner

FIG.5

TRD

| CONVERSION FORMAT | PCL |
|---|---|
| JOB ID | 20110628-00002451245 |
| PRINTER ID | 55463547 |

FIG.6

PRD

| JOB ID | 20110628-00002451245 |
|---|---|
| CONVERTING APPARATUS | http://elkfjwfwefafa:pojk |

FIG.7

| JOB ID | PRINTER ID | ACCESS PATH | STATUS | ... |
|---|---|---|---|---|
| 20110628-00002451245 | 55463556 | — | START CONVERSION | ... |
| 20110628-00002543121 | 46354701 | — | CONVERTING | ... |
| 20110627-00003254790 | 55463547 | D:¥StorageAA¥BBB¥.... | CONVERTED (COMPLETED) | ... |
| ... | ... | ... | ... | ... |

| INQUIRING TIME INTERVAL | 300(sec) |
|---|---|
| RESPONSE TIME LIMIT | 60(sec) |
| .... | .... |

FIG.10

TRD

| CONVERSION FORMAT | PCL |
|---|---|
| JOB ID | 20110628-00002451245 |
| PRINTER ID | 55463547 |
| PRIORITY | 5(HIGH) |

FIG.13A

TRD

| CONVERSION FORMAT | PCL |
|---|---|
| PRINTER ID | 55463547 |

FIG.13B

JRD

| JOB ID | 20110628-00002451245 |
|---|---|

FIG.16A

TRD

| CONVERSION FORMAT | PCL |
|---|---|
| PRINTER ID | 55463547 |
| SIZE | 512(Kbytes) |

FIG.16B

JTRD

| JOB ID | 20110628-00002451245 |
|---|---|
| PREDICTED TIME | 2011/07/30 21:09:30 |

| CONVERSION FORMAT | METHOD OF CALCULATION (y:time,x:data_size) |
|---|---|
| PCL | $y = -4E-05x^2 + 0.0532x + 2.011$ |
| PS | $y = -4E-05x^2 + 0.0532x + 2.012$ |
| RPCS | $y = -4E-05x^2 + 0.0532x + 2.013$ |

FIG.18

PRD

| JOB ID | 20110628-00002451245 |
|---|---|
| CONVERTING APPARATUS | http://elkfjwfwefafa:pojk |
| PREDICTED TIME | 2011/07/30 21:09:30 |

PRINT CONTROL SYSTEM, METHOD OF CONTROLLING PRINTING, AND RECORDING MEDIUM

CROSS-REFERENCE TO RELATED APPLICATION

This application is a continuation application of U.S. patent application Ser. No. 13/632,367 filed on Oct. 1, 2012, which claims the benefit of priority of Japanese Priority Application No. 2011-229742 filed on Oct. 19, 2011, the entire contents of which are hereby incorporated by reference.

BACKGROUND OF THE INVENTION

1. Field of the Invention

The present invention relates to a technique of controlling printing.

2. Description of the Related Art

In Patent Document 1, for example, a technique in which a server receives application data from a portable terminal, converts the application data to print data capable of being printed by rendering, and sends the converted print data to a printer is disclosed. As described above, a print control system of a push type printing is known.

In the above print control system, the server is connected to an internal network such as an internal Local Area Network (LAN) or the like. In other words, in the above print control system, the portable terminal, the server, and the printer are connected with each other in a private environment. However, recently, a wide area print service has been developed in which a server is connected to an external network such as the INTERNET or the like so that application data to be converted by the server is accepted via the external network and converted print data is also sent to a printer via the external network.

When a server connected to the external network is used to convert the application data, according to the conventional method as described above, there may be a problem as follows. Generally, there is provided a firewall between an internal network and an external network in a view of security. In such a case, the server connected to the external network cannot send the converted print data to a printer connected to an internal network. It means that according to the conventional method, a push type printing cannot be performed using a server provided in a public environment.

PATENT DOCUMENT

[Patent Document 1] Japanese Laid-open Patent Publication No. 2001-290742

SUMMARY OF THE INVENTION

The present invention is made in light of the above problems, and provides a technique of controlling printing by which a push type printing can be performed using a data conversion apparatus connected to an external network.

According to an embodiment, there is provided a print control system including a data conversion apparatus including a data conversion unit that converts application data to print data; an image processing apparatus including a print control unit that prints print data; and a data processing apparatus including a data conversion request unit that sends conversion request data including application data to be processed to the data conversion apparatus for requesting the converting of the application data to print data, and a print request unit that sends print request data including converting apparatus data indicating a data conversion apparatus from which print data to print is to be obtained to the image processing apparatus for requesting the obtaining of the converted print data from the indicated data conversion apparatus and printing the obtained print data.

According to another embodiment, there is provided a method of controlling printing used in a print control system including a data conversion apparatus that converts application data to print data, an image processing apparatus that prints print data, and a data processing apparatus including a data conversion requesting step, performed by the data processing apparatus, of sending conversion request data including application data to be processed to the data conversion apparatus for requesting the converting of the application data to print data, and a print requesting step, performed by the data processing apparatus, of sending print request data including converting apparatus data indicating a data conversion apparatus from which print data to print is to be obtained to the image processing apparatus for requesting the obtaining of the print data converted by the indicated data conversion apparatus and printing the obtained print data.

According to another embodiment, there is provided a non-transitory computer-readable recording medium having recorded thereon a program that causes a computer connected to a data conversion apparatus that converts application data to print data and an image processing apparatus that prints print data to execute a method of controlling printing, including a data conversion requesting step, performed by the data processing apparatus, of sending conversion request data including application data to be processed to the data conversion apparatus for requesting the converting of the application data to print data, and a print requesting step, performed by the data processing apparatus, of sending print request data including converting apparatus data indicating a data conversion apparatus from which print data to print is to be obtained to the image processing apparatus for requesting the obtaining of the print data converted by the indicated data conversion apparatus and printing the obtained print data.

Note that also arbitrary combinations of the above-described constituents, and any exchanges of expressions in the present invention, made among method, device, system, recording medium, computer program and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 5 is a view showing an example of conversion request data of the embodiment;

FIG. 6 is a view showing an example of print request data of the embodiment;

FIG. 7 is a view showing an example of management information of the embodiment;

FIG. 8 is a view showing an example of control information of the embodiment;

FIG. 10 is a view showing another example of the conversion request data;

FIG. 13A is a view showing an example of conversion request data TRD of the embodiment FIG. 13B is a view showing an example of job ID notification data of the embodiment;

FIG. 16A is a view showing an example of conversion request data of the embodiment;

FIG. 16B is a view showing an example of job ID-predicted time notification data of the embodiment;

FIG. 17 is a view showing an example of calculation data for calculating a predicted time;

FIG. 18 is a view showing an example of print request data of the embodiment;

DETAILED DESCRIPTION OF THE PREFERRED EMBODIMENTS

Figure 1:
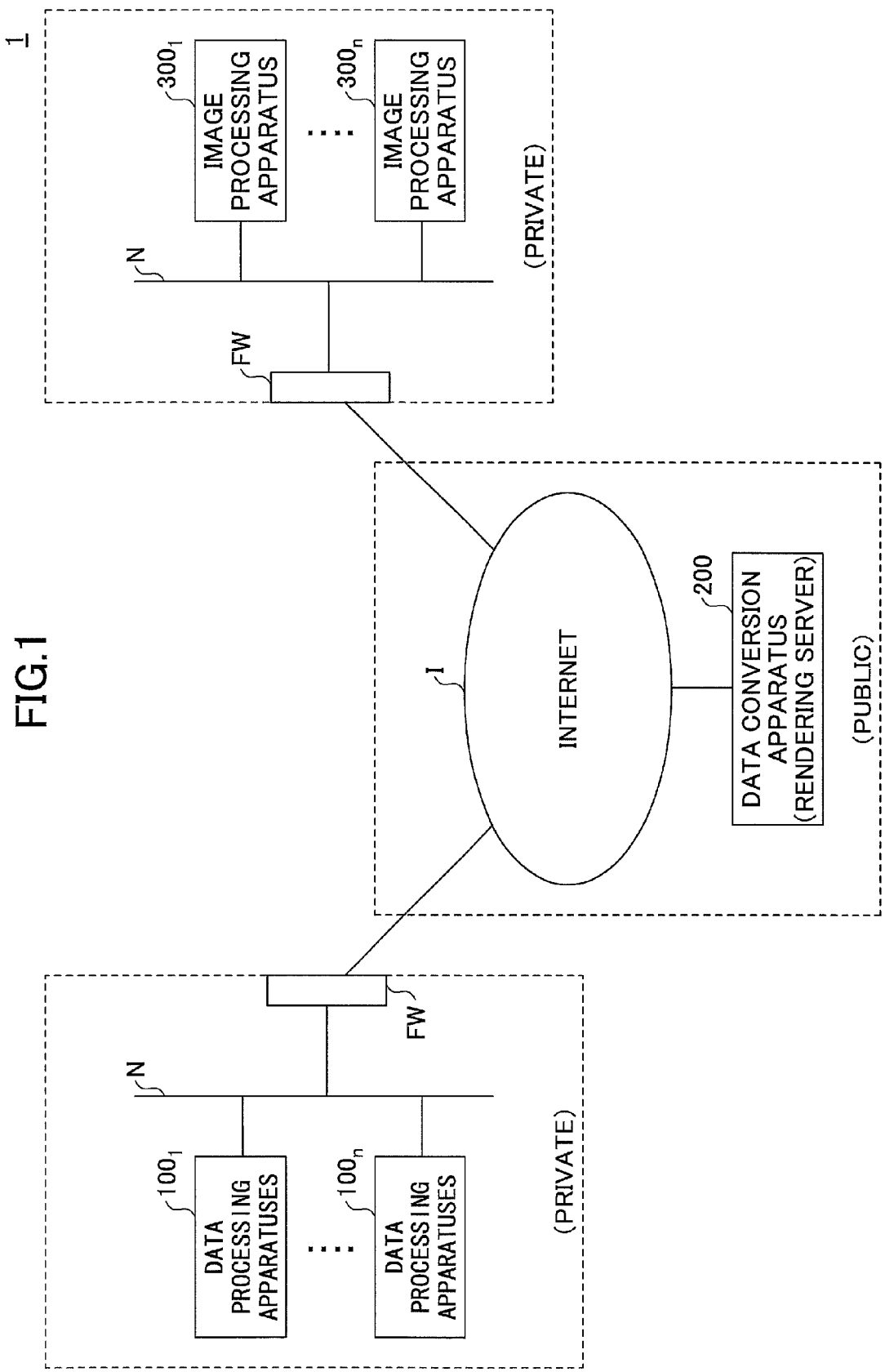
FIG. 1 is a view showing an example of a structure of a print control system of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

First Embodiment

System Structure

FIG. 1 is a view showing an example of a structure of a print control system 1 of the embodiment.

The print control system 1 shown in FIG. 1 includes one or more data processing apparatuses 100$_1$ to 100$_n$ (each of which is simply referred to as a "data processing apparatus 100" as well), one or more image processing apparatuses 300$_1$ to 300$_n$ (each of which is simply referred to as an "image processing apparatus 300" as well), and one or more data conversion apparatuses 200. The data processing apparatuses 100$_1$ to 100$_n$ and the image processing apparatuses 300$_1$ to 300$_n$ are respectively connected to an internal network N. The data conversion apparatuses 200 are connected to an external network I which is connected to the internal networks N via the firewalls FW, respectively. It means that the data processing apparatuses and the image processing apparatuses 300 are secured by the firewalls FW, with respect to the data conversion apparatuses 200.

The data processing apparatus 100 has a data processing function and is a user terminal such as a Personal Computer (PC) or the like. The image processing apparatus 300 has an image processing function including a printing function. The image processing apparatus 300 may be a printer, a Multifunction Peripheral (MFP) or the like.

The data conversion apparatus 200 has a data conversion function of converting data received from the data processing apparatus 100 to print data capable of being printed by the image processing apparatus 300. The data conversion apparatus 200 is a rendering server or the like.

Figure 2:
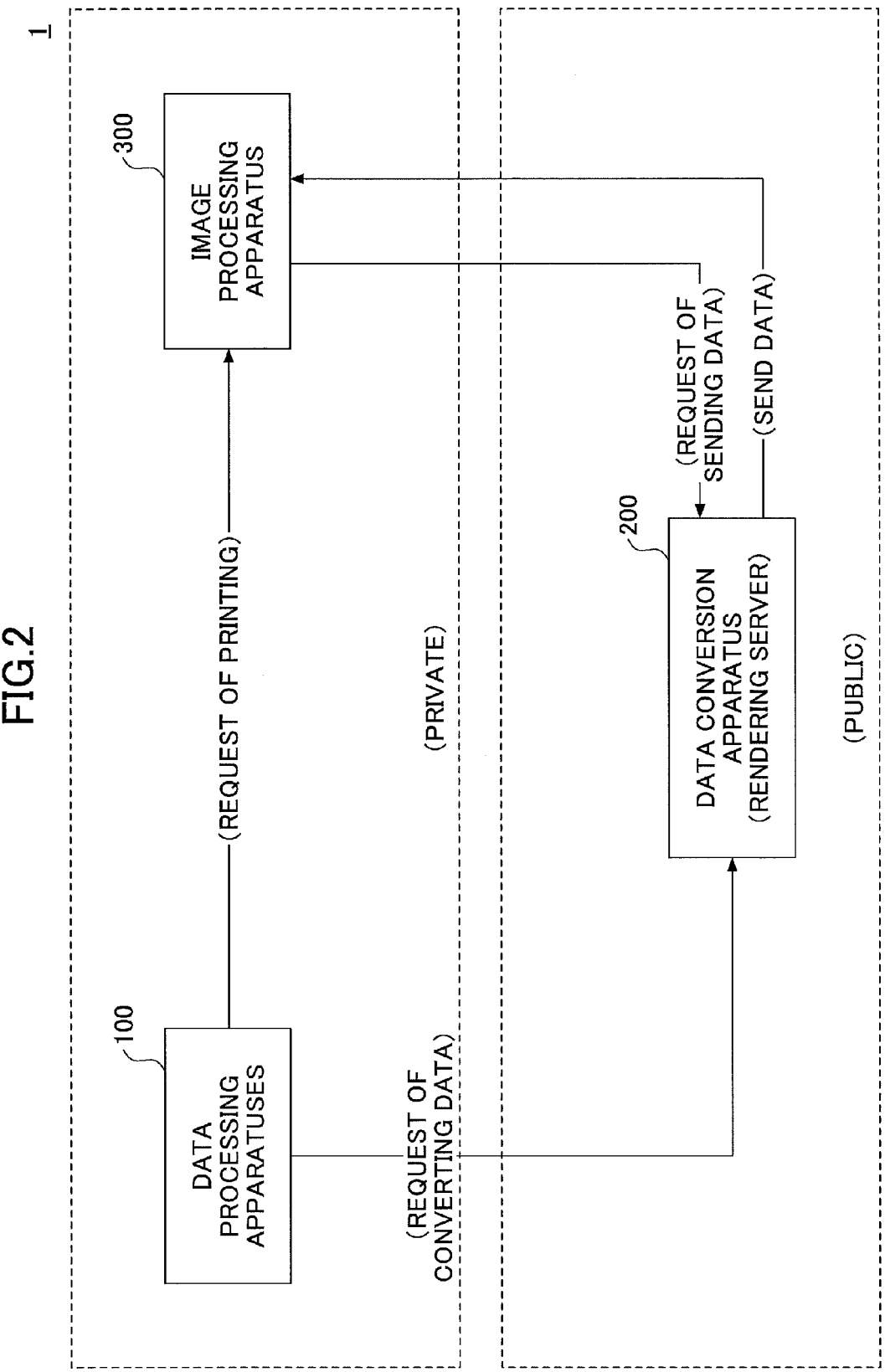
FIG. 2 is a view showing an example of an operation of a print service provided by the print control system.

The print control system 1 of the embodiment provides the print service as shown in FIG. 2, for example. FIG. 2 is a view showing an example of an operation of a print service provided by the print control system 1.

The data processing apparatus 100 accepts selections of application data to be processed and a data conversion apparatus 200 by a user via an operation panel or the like and sends a request of converting application data to print data with the application data to the selected one of the data conversion apparatuses 200. Then, the data conversion apparatus 200 converts the received application data to print data. Further, upon accepting the selection of the application data to be processed, the data processing apparatus 100 sends a request of printing the print data converted by the selected data conversion apparatus 200 data with data indicating the selected data conversion apparatus 200, to a selected one of the image processing apparatuses 300. Then, upon receiving the request of printing, the selected image processing apparatus 300 sends a request of sending the converted print data, to the data conversion apparatus 200 specified by the data indicating the selected data conversion apparatus 200. Subsequently, when the print data is obtained from the selected data conversion apparatus 200, the image processing apparatus 300 prints the print data sent from the selected data conversion apparatus 200.

At this time, the data conversion apparatus 200 to convert and the image processing apparatus 300 to print may be automatically selected by the data processing apparatus 100, a functional component of the print control system 1 or the like.

As described above, according to the print control system 1 of the embodiment, a print service capable of performing a push type printing using the data conversion apparatus 200 connected to the external network I is provided.

Further, in this embodiment, as described above, the data processing apparatus 100 can use the print service by just sending the application data, not the print data. Thus, it is not necessary for the data processing apparatus 100 to have a function of converting application data to print data, such as is performed by a printer driver. Specifically, the data processing apparatus 100 may be a Smartphone, a tablet PC, a projector, a media board or the like.

(Hardware Structure)

Figure 3:
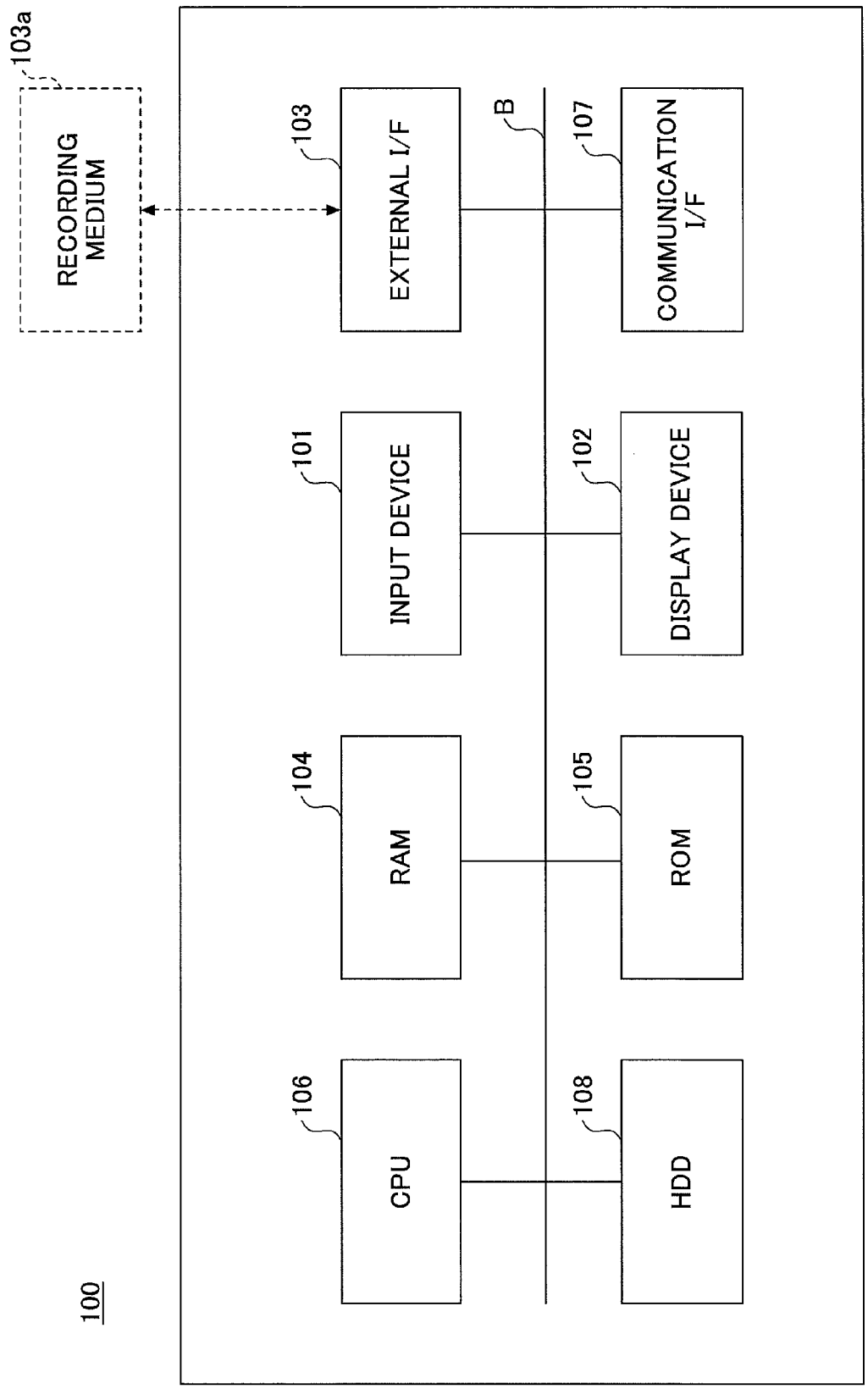
FIG. 3 is a block diagram showing an example of a hardware structure of a data processing apparatus of the embodiment.

FIG. 3 is a block diagram showing an example of a hardware structure of the data processing apparatus 100 of the embodiment.

As shown in FIG. 3, the data processing apparatus 100 includes an input device 101, a display device 102, an external interface (I/F) 103, a Random Access Memory (RAM) 104, a Read-Only Memory (ROM) 105, a Central Processing Unit (CPU) 106, a communication interface (I/F) 107, a Hard Disk Drive (HDD) 108 and the like, which are connected with each other via a BUS B.

The input device 101 includes a keyboard, a mouse or the like and is used for inputting various operational signals into the data processing apparatus 100. The display device 102 includes a display or the like and displays a result processed by the data processing apparatus 100.

The communication I/F 107 connects the data processing apparatus 100 to a network such as the internal networks N shown in FIG. 1. With the function of the communication I/F 107, the data processing apparatus 100 is capable of communicating with other apparatuses such as the data conversion apparatus 200, the image processing apparatus 300 or the like via the communication I/F 107.

The HDD 108 is a nonvolatile storage device storing programs or data. The programs or data stored in the HDD 108 may be an Operating System (OS) which is basic software controlling the entirety of the apparatus, application software providing various functions on the OS, or the like. The HDD 108 manages the programs or data stored therein by a predetermined file system and/or a Database (DB).

The external I/F 103 is an interface for an external device such as a recording medium 103a or the like. With the function of the external I/F 103, the data processing apparatus 100 is capable of reading and/or writing data in the recording medium 103a via the external I/F 103. The recording medium 103a may be a floppy (registered trademark) disk, a Compact Disk (CD), a Digital Versatile Disk (DVD), an SD memory card, a Universal Serial Bus memory (USB memory) or the like.

The ROM 105 is a nonvolatile semiconductor memory (storage device) capable of storing data even when power is switched off. The ROM 105 stores Basic Input/Output System (BIOS) which is executed when initiating the data processing apparatus 100, program or data for setting the OS or network, or the like. The RAM 104 is a volatile semiconductor memory (storage device) temporarily storing programs or data. The CPU 106 is an arithmetic unit which reads out the programs or data from the storage devices such as the HDD 108, the ROM 105 or the like on the RAM 104 and actualizes controlling of the entirety of the apparatus and functions on the apparatus.

As described above, according to the data processing apparatus 100 of the embodiment, various processing services including controlling printing, with the above hardware structure.

Although not shown in the drawings, each of the data conversion apparatuses 200 and each of the image processing apparatuses 300 have the same hardware structures as explained above with reference to FIG. 3.

(Print Control Function)

The print control function of the embodiment is explained.

In the print control system 1 of the embodiment, the data processing apparatus 100 connected to the internal network N sends conversion request data including application data to be processed, to the data conversion apparatus 200 connected to the external network I for requesting a conversion of the application data to print data. Upon receiving the conversion request data, the data conversion apparatus 200 converts the received application data to print data.

Further, the data processing apparatus 100 sends print request data including an indication of one of the data conversion apparatuses 200 selected to convert the application data and from which the image processing apparatus 300 is to obtain the converted print data, to one of the image processing apparatuses 300 connected to the internal network N and selected to print for requesting the printing.

Upon receiving the print request data, the image processing apparatus 300 requests sending the print data to the data conversion apparatus 200 selected to convert the application data. Then, upon receiving the print data, the image processing apparatus 300 prints the print data. The print control system 1 of the embodiment has such a print control function.

According to the conventional system, a following problem may occur. In the internal network N, internal addresses of apparatuses may be masked by a router so that it may be difficult to determine the addresses within the firewall FW (see FIG. 1) from the external network I. Further, even when an apparatus can be specified by a public address, the external access may be blocked by the firewall FW. Thus, in the conventional system, a push type printing cannot be performed as it is difficult to send converted print data from a data conversion apparatus connected to the external network I to an image processing apparatus connected to the internal network N because of the firewall FW.

Thus, in the print control system 1 of the embodiment, the data processing apparatus 100 is configured to send a request of obtaining print data from the selected data conversion apparatus 200 and printing the obtained print data to the image processing apparatus 300 selected to print, in addition to sending a request of converting application data to print data to the selected data conversion apparatus 200.

With this, the print control system 1 of the embodiment provides an environment in which the image processing apparatus 300 selected to print is capable of dynamically obtaining the print data from the data conversion apparatus 200 and printing the obtained print data. Thus, according to the print control system 1 of the embodiment, it is not necessary for a user to perform a pull type printing as follows.

In the pull type printing, for example, it is necessary for a user to first send a request of converting application data to print data, to the selected data conversion apparatus 200. Then, it is necessary for the user to move to the image processing apparatus 300, select the print data converted by the data conversion apparatus 200 to be obtained from the data conversion apparatus 200 and instruct to print the obtained print data at the image processing apparatus 300.

According to the print control system 1 of the embodiment, a pseudo-push type printing can be performed using the data conversion apparatus 200 connected to the external network I.

The print control function of the embodiment is explained.

Figure 4:
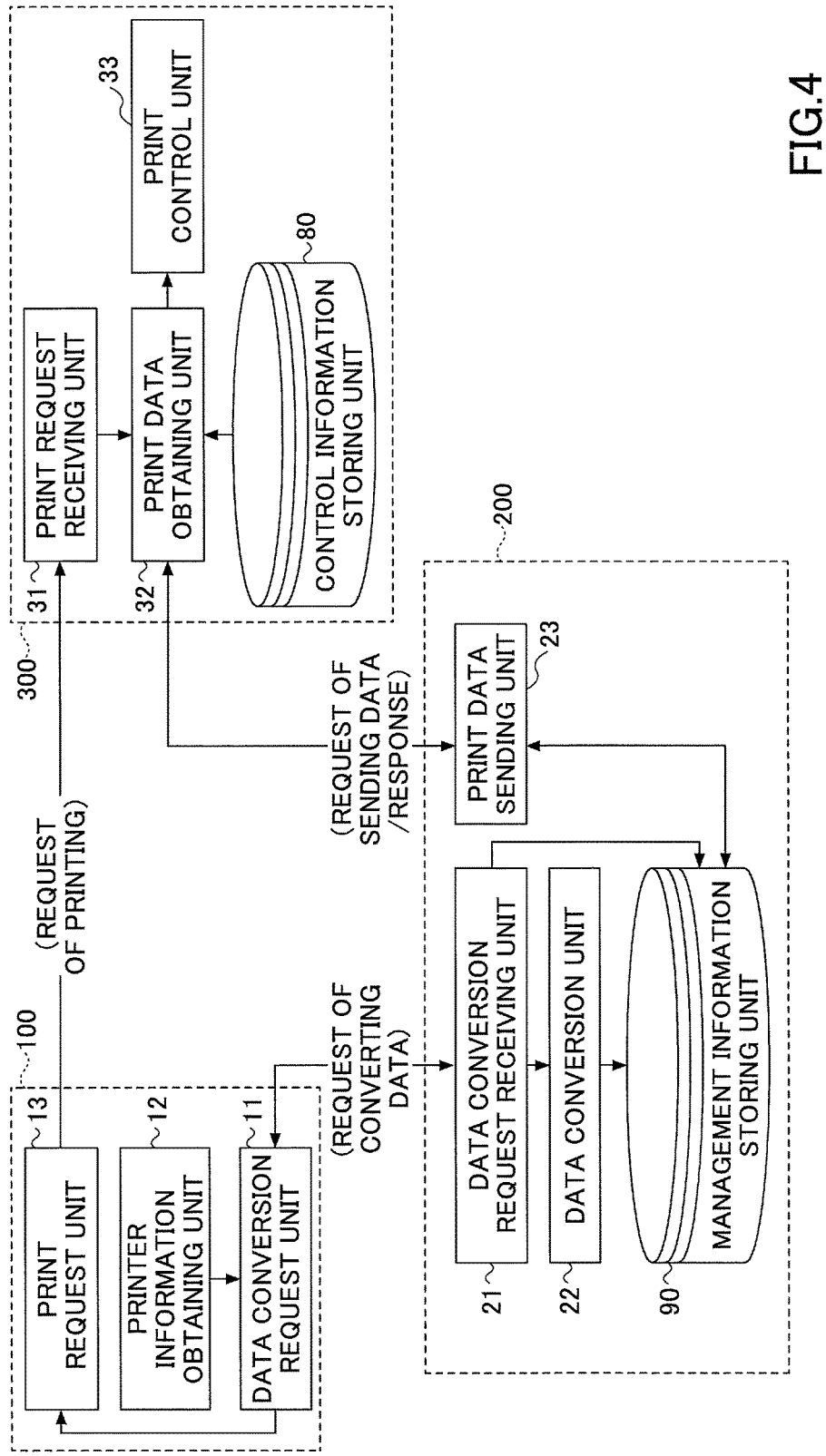
FIG. 4 is a block diagram showing an example of the print control function of the embodiment.

FIG. 4 is a block diagram showing an example of the print control function of the embodiment.

As shown in FIG. 4, the data processing apparatus 100 of the embodiment includes a data conversion request unit 11, a printer information obtaining unit 12, a print request unit 13 and the like as the print control function.

The data conversion apparatus 200 includes a data conversion request receiving unit 21, a data conversion unit 22, a print data sending unit 23 and the like as the print control function. The data conversion apparatus 200 further includes a management information storing unit 90.

The image processing apparatus 300 includes a print request receiving unit 31, a print data obtaining unit 32, a print control unit 33 and the like as the print control function. The image processing apparatus 300 further includes a control information storing unit 80.

As described above, the print control function of the embodiment is actualized by a combination of the components.

(Data Processing Apparatus 100)

The data conversion request unit 11 requests a data conversion to the data conversion apparatus 200. The data conversion request unit 11 sends conversion request data including application data to be processed for requesting a conversion of the application data to print data, to the data conversion apparatus 200.

The conversion request data sent by the data conversion request unit 11 is explained.

FIG. 5 is a view showing an example of conversion request data TRD of the embodiment. As shown in FIG. 5, the conversion request data TRD includes data corresponding to items such as "conversion format", "job ID", "printer ID" or the like, in addition to the application data, although the application data is not shown in FIG. 5.

Data corresponding to the item "conversion format" (hereinafter simply referred to as "conversion format data") indicates a conversion format (a data format) of print data to be generated. The conversion format data may be an identifier of Page Description language (PDL) (PDL name, for example, hereinafter simply referred to as a "PDL identifier") or the like.

Data corresponding to the item "job ID" (hereinafter simply referred to as "job ID data") is a value for identifying the application data (a job) to be processed. The job ID data may be an identifier uniquely allocated to the application data.

Data corresponding to the item "printer ID" (hereinafter simply referred to as "printer ID data") is a value for identifying the image processing apparatus 300 selected to print. The printer ID data may be an identifier uniquely allocated to the image processing apparatus 300 such as printer ID, Internet Protocol Address (IP address) or the like, for example.

Referring back to FIG. 4, the data conversion request unit 11 displays an operation panel for accepting a selection of application data to be processed and a selection of one of the image processing apparatuses 300 to print. When a user selects application data (job) to be processed and the image processing apparatus 300 to print via the operation panel, the data conversion request unit 11 accepts the selections. Then, the data conversion request unit 11 generates the conversion request data TRD. At this time, the data conversion request unit 11 issues unique job ID data for the selected application data. Further, the data conversion request unit 11 obtains printer information including printer ID data of the selected image processing apparatus 300 to print and conversion format data from the printer information obtaining unit 12, as will be explained later.

With this, the data conversion request unit 11 generates the conversion request data TRD including the application data, the job ID data, the printer ID data, and the conversion format data. Then, the data conversion request unit 11 sends the generated conversion request data TRD to the data conversion apparatus 200.

Here, before sending the conversion request data TRD, the data conversion request unit 11 may determine whether the data conversion apparatus 200 is capable of converting the application data to be processed to the print data. Then, the data conversion request unit 11 may send the conversion request data TRD to the data conversion apparatus 200 when it is determined that the data conversion apparatus 200 is capable of converting the application data to the print data. At this time, the data conversion request unit 11 may determine whether the data conversion apparatus 200 is capable of converting the application data to the print data based on an extension of the application data such that whether the extension of the application data matches the extensions of data capable of being converted by the data conversion apparatus 200.

Further, when there are plural data conversion apparatuses 200 existing, the data conversion request unit 11 may automatically select one of the data conversion apparatuses 200 to send the conversion request data TRD.

The printer information obtaining unit 12 obtains printer information. The printer information may be obtained by a two-way communication of a printer driver, or may be obtained from a registry of the OS, for example. The printer information includes the printer ID data, the conversion format data such as the PDL identifier which is adaptable for the corresponding image processing apparatus, or the like. The printer information obtaining unit 12 obtains printer information of the image processing apparatus 300 selected to print via the operation panel, and stores the obtained printer information in the predetermined storage area.

Here, when the data conversion request unit 11 cannot obtain sufficient data such as the printer ID data, the conversion format data or the like from the printer information, the data conversion request unit 11 may display an operation panel capable of inputting or selecting the insufficient data, and may accept input or selection by the user. At this time, the operation panel may include information formed based on a configuration file in which default values for the corresponding items are set, for example. Then, the accepted values may be stored in the configuration file. The default values of the conversion format data in the configuration file may include a value indicating the conversion format capable of being converted by the data conversion apparatus 200, conversion format adaptable for an environment in which the image processing apparatus 300 is placed, or the like.

The print request unit 13 requests printing to the image processing apparatus 300. The print request unit 13 sends print request data including information indicating the data conversion apparatuses 200 selected to convert the application data and from which the image processing apparatus 300 is to obtain the converted print data, to the image processing apparatus 300 selected to print among the image processing apparatuses 300 connected to the internal network N.

The print request data is explained.

FIG. 6 is a view showing an example of print request data PRD of the embodiment. As shown in FIG. 6, the print request data PRD includes data corresponding to items such as the "job ID", "converting apparatus" or the like.

Data corresponding to the item "job ID" (job ID data) is the value for identifying the application data (a job) to be processed for which the data conversion request unit 11 requests converting to print data the conversion to the print data. It means that the job ID data in the print request data PRD is identification of print data to obtain for the image processing apparatus 300.

Data corresponding to the item "converting apparatus" (hereinafter simply referred to as "converting apparatus data") is a value indicating the data conversion apparatus 200 selected to convert to which the data conversion request unit 11 requests converting to print data. The converting apparatus data may be an access path to the data conversion apparatus 200 ("Uniform Resource Identifier (URI), for example). It means that the converting apparatus data in the print request data PRD is information about the data conversion apparatus 200 to obtain the print data for the image processing apparatus 300.

Referring back to FIG. 4, the print request unit 13 receives the data corresponding to the items from the data conversion request unit 11, generates the print request data PRD including the converting apparatus data based on the received data, and sends the print request data PRD to the image processing apparatus 300 selected to print.

As described above, the data processing apparatus 100 requests obtaining the print data and printing the obtained print data to the image processing apparatus 300 selected to print as well as requesting converting to the print data to the data conversion apparatus 200.

(Data Conversion Apparatus 200)

The data conversion request receiving unit 21 receives the request of converting application data to print data from the data processing apparatus 100. Specifically, the data conversion request receiving unit 21 receives the conversion request data TRD including the application data sent from the data conversion request unit 11 of the data processing apparatus 100.

The data conversion unit 22 converts the received application data to print data. The data conversion unit 22 specifies a conversion format (a data format) for the print data based on the conversion format data included in the conversion request data TRD, and converts the application data to the print data (PDL data, for example) of the specified conversion format. The data conversion unit 22 stores the converted print data in a predetermined storage area in a storing device of the data conversion apparatus 200.

The conversion request data TRD received by the data conversion request receiving unit 21 and the print data converted by the data conversion unit 22 are managed in the data conversion apparatus 200 based on management information as shown in FIG. 7, for example.

The management information is explained. FIG. 7 is a view showing an example of management information 90D of the embodiment.

As shown in FIG. 7, the management information 90D includes one or more data sets in each of which the job ID, the printer ID, an access path, a status and the like are corresponded with each other. The data set is prepared for each of the received request of converting application data to print data.

The job ID data in the conversion request data TRD is stored in the item "job ID". The printer ID data in the conversion request data TRD is stored in the item "printer ID".

The item "access path" stores information indicating an access path to the print data (storage area at which the print data is stored, hereinafter referred to as "access path data").

The item "status" stores a status of a data conversion (hereinafter referred to as "status information"). The status may be "start conversion", "converting", "converted (completed)" or the like.

These data corresponding to the items are stored in the management information storing unit 90.

These data corresponding to the items are stored and updated by the data conversion request receiving unit 21 and the data conversion unit 22.

The data conversion request receiving unit 21 accesses the management information storing unit 90, and generates the data set for the received conversion request data TRD by registering the job ID data and the printer ID data included in the received conversion request data TRD for the item "job ID" and the item "printer ID", respectively.

The data conversion unit 22 records the status of the data conversion for the item "status" of the corresponding data set generated by the data conversion request receiving unit 21, and further updates the status in accordance with the progress of the data conversion. When the data conversion is completed and the converted print data is stored in the predetermined storage area in the storing device of the data conversion apparatus 200, the data conversion unit 22 records an access path for the item "access path" of the corresponding data set generated.

The print data sending unit 23 responds to a request of sending print data sent from the image processing apparatus 300. Specifically, the print data sending unit 23 receives the request of sending print data of the application data to be processed identified by the job ID data received from the image processing apparatus 300, and sends the status information or the print data. At this time, when the print data sending unit 23 receives the request from the image processing apparatus 300, the print data sending unit 23 accesses the management information storing unit 90, specifies the data set in the management information 90D based on the received job ID data, and refers to the status information (or the access path data) of the specified data set. When the status information is "start conversion" or "converting", the print data sending unit 23 sends a notice that the application data to be processed in the request of sending print data is now being converted to the image processing apparatus 300 in response. On the other hand, when the status information is "converted (completed)", the print data sending unit 23 obtains the print data based on the access path data, and sends the obtained print data to the image processing apparatus 300 in response.

As described above, the data conversion apparatus 200 converts the application data to be processed to the print data in accordance with the request of converting application data to print data from the data processing apparatus 100, and sends the converted print data to the image processing apparatus 300 in accordance with the request of sending print data.

(Image Processing Apparatus 300)

The print request receiving unit 31 receives a request of printing from the data processing apparatus 100. The print request receiving unit 31 receives the print request data PRD including the converting apparatus data sent from the print request unit 13 of the data processing apparatus 100.

The print data obtaining unit 32 sends a request of sending print data to the data conversion apparatus 200. Specifically, the print data obtaining unit 32 accesses the data conversion apparatus 200 based on the converting apparatus data included in the print request data PRD received by the print request receiving unit 31, and sends a request command of sending print data including the job ID data of the application data to be processed included in the print request data PRD for requesting the sending of the print data.

Then, in response to the request, the print data sending unit 23 of the data conversion apparatus 200 sends the status information or the print data to the print data obtaining unit 32. When the status information is sent from the data conversion apparatus 200, the print data obtaining unit 32 re-sends the request of sending print data after a predetermined period has passed and repeats this operation until the print data is sent from the data conversion apparatus 200. This operation is controlled by control information as shown in FIG. 8, for example.

FIG. 8 is a view showing an example of control information 80D of the embodiment. As shown in FIG. 8, the control information 80D includes control parameter values such as "inquiring time interval" indicating time interval for sending the request, "response time limit" indicating response time limit (time out) in response to the request or the like. The control information 80D is stored in the control information storing unit 80.

The control information 80D may be previously set in accordance with an operating policy of the provided print service by an administrator, for example.

Referring back to FIG. 4, when sending the request, the print data obtaining unit 32 accesses the control information storing unit 80, and controls communication with the data conversion apparatus 200 based on the response time limit set in the control information 80D. Specifically, the print data obtaining unit 32 counts response time from the data conversion apparatus 200 by a timing circuit (not shown in the drawings) of the image processing apparatus 300, performs a predetermined error operation when the counted value exceeds the set response time limit and then completes sending the request. When the status information is sent from the data conversion apparatus 200, the print data obtaining unit 32 controls inquiring to the data conversion apparatus 200 based on the inquiring time interval set in the control information 80D. Specifically, the print data obtaining unit 32 repeats inquiring to the data conversion apparatus 200 with the set inquiring time interval.

The print control unit 33 controls printing. The print control unit 33 prints the print data obtained by the print data obtaining unit 32. Specifically, the print control unit 33 sends the print data to a plotter (not shown in the drawings) included in the image processing apparatus 300, and controls printing by the plotter in accordance with a predetermined printing condition.

As described above, the image processing apparatus 300 requests sending the print data which is converted from the application data to be processed, to the data conversion apparatus 200 in response to a request of printing from the data processing apparatus 100, and prints the obtained print data.

As described above, the print control function of the embodiment is actualized by a combination of the components. Further, the above functional components are actualized when arithmetic units (CPUs) read programs installed in the apparatuses or devices composing the print control system 1 from the storage devices (HDDs or ROMs) on the memories (RAMs), respectively.

The operation of the print control function of the embodiment is explained in detail with respect to a sequence diagram.

Figure 9:
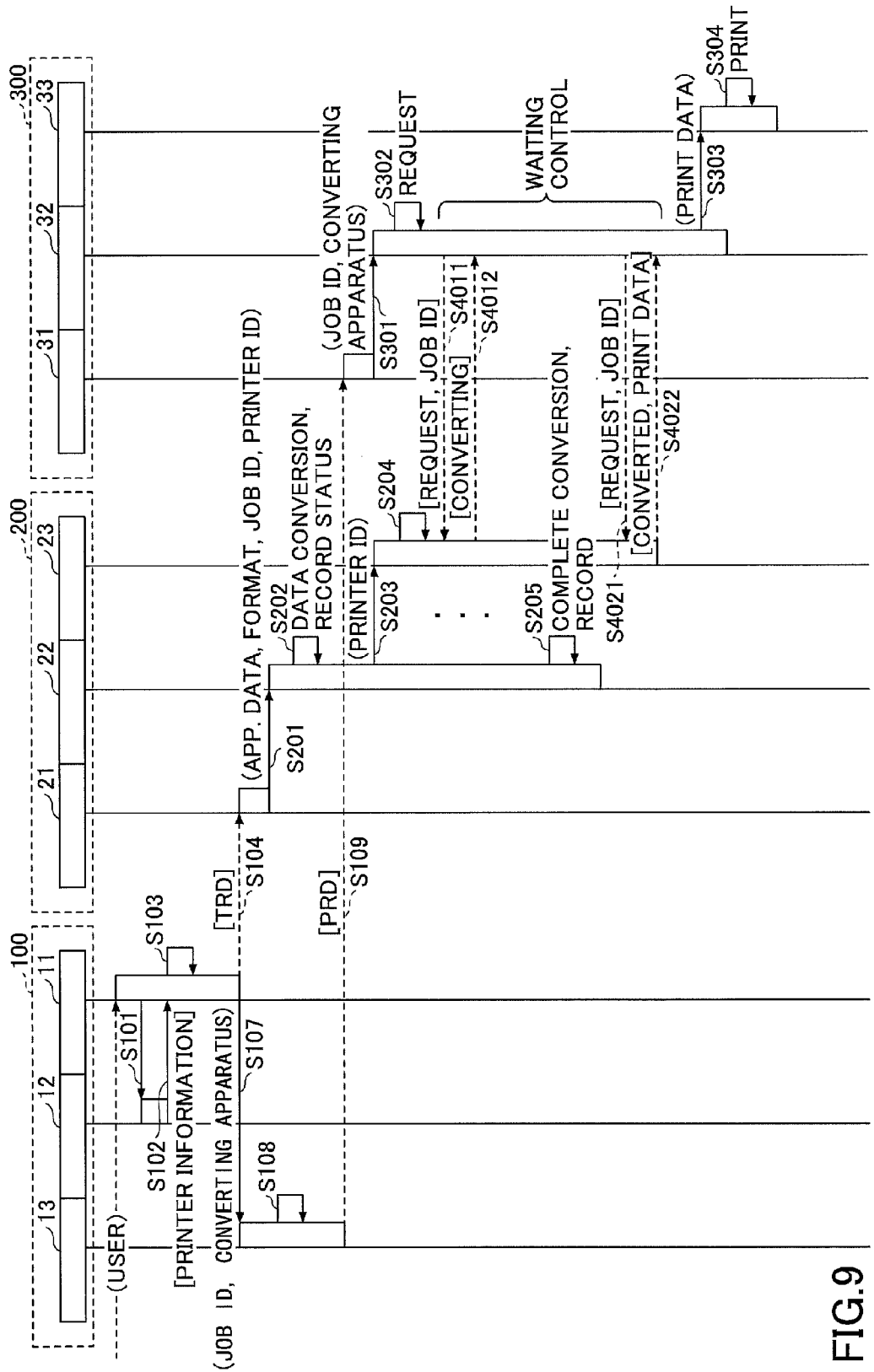
FIG. 9 is a sequence diagram showing an example of an operation of print control of the embodiment.

FIG. 9 is a sequence diagram showing an example of an operation of print control of the embodiment.
(Operation by Data Processing Apparatus 100)

Upon an instruction from the user, the data conversion request unit 11 displays an operation panel and accepts selections of application data to be processed and the image processing apparatus 300 to print the selected application data. At this time, the data conversion request unit 11 issues job ID data for the application data to be processed.

Then, the data conversion request unit 11 indicates the printer information obtaining unit 12 to obtain the printer information of the selected image processing apparatus 300 (step S101).

When the printer information obtaining unit 12 obtains the printer information, the data conversion request unit 11 refers to the printer information obtained by the printer information obtaining unit 12 (step S102). Then, the data conversion request unit 11 generates the conversion request data TRD including the selected application data, the job ID data, and the conversion format data and the printer ID data obtained from the printer information of the selected image processing apparatus 300 (step S103). The data conversion request unit 11 sends the conversion request data TRD for requesting a conversion of the application data to print data, to the data conversion apparatus 200 (step S104).

Further, the data conversion request unit 11 indicates the print request unit 13 to send a request of printing (step S107). At this time, the data conversion request unit 11 outputs the job ID data and the converting apparatus data to the print request unit 13. Then, the print request unit 13 generates the print request data PRD including the job ID data and the converting apparatus data (step S108). The print request unit 13 sends the print request data PRD for requesting the obtaining of the print data and printing the obtained print data, to the image processing apparatus 300 (step S109).
(Operation by Data Conversion Apparatus 200)

When the data conversion apparatus 200 receives the conversion request data TRD from the data processing apparatus 100, the data conversion request receiving unit 21 indicates the data conversion unit 22 to convert the received application data to print data (step S201). At this time, the data conversion request receiving unit 21 outputs the application data, the conversion format data, the job ID data, and the printer ID data included in the conversion request data TRD to the data conversion unit 22.

Further, at this time, the data conversion request receiving unit 21 accesses the management information storing unit 90, records the job ID data and the printer ID data included in the received conversion request data TRD as values for the items "job ID" and "printer ID" respectively, and generates a data set of the management information 90D for the received conversion request data TRD.

Then, the data conversion unit 22 starts converting the application data to print data (step S202). At this time, the data conversion unit 22 converts the application data to print data of the conversion format specified by the conversion format data. Meanwhile, the data conversion unit 22 records the status of the conversion "start conversion" or "converting" for the item "status" in the data set of the management information 90D generated by the data conversion request receiving unit 21. The data conversion unit 22 may periodically update the status of the conversion in accordance with the operation.

The data conversion unit 22 indicates the print data sending unit 23 to wait for a request of sending print data from the image processing apparatus 300 (step S203). At this time, the data conversion unit 22 outputs the printer ID data to the print data sending unit 23.

Then, the print data sending unit 23 starts waiting for the request of sending print data from the image processing apparatus 300 identified by the printer ID data (step S204). When the print data sending unit 23 receives the request of sending print data from the identified image processing apparatus 300, the print data sending unit 23 accesses the management information storing unit 90, and refers to the status information of the management information 90D specified by the received job ID data. When the status information is "start conversion" or "converting", the print data sending unit 23 responds to the image processing apparatus 300 which has sent the request that the application data to be processed specified by the request is now being converted. When the status information is "converted (completed)", the print data sending unit 23 obtains the converted and stored print data based on the access path data, and sends the converted print data converted from the application to be processed specified by the job ID data included in the request of sending print data, to the image processing apparatus 300.

(Operation by Image Processing Apparatus 300)

When the image processing apparatus 300 receives the request of obtaining the print data and printing the obtained print data from the data processing apparatus 100, the print request receiving unit 31 indicates the print data obtaining unit 32 to send the request of sending print data (step S301). At this time, the print request receiving unit 31 outputs the job ID data and the converting apparatus data included in the received print request data PRD to the print data obtaining unit 32.

Then, the print data obtaining unit 32 sends the request of sending print data to the data conversion apparatus 200 (step S302). At this time, the print data obtaining unit 32 accesses the data conversion apparatus 200 identified by the converting apparatus data, and sends the request of sending print data by sending the request command of sending print data of the application data to be processed including the job ID data (step S4011). At this time, when the application data identified by the job ID data is being converted by the data conversion apparatus 200, the fact that the application data is being converted is sent to the print data obtaining unit 32, for example (step S4012).

Further at this time, the print data obtaining unit 32 accesses the control information storing unit 80 and controls communication with the data conversion apparatus 200 based on the response time limit set in the control information 80D. Specifically, when the status information is sent from the data conversion apparatus 200, the print data obtaining unit 32 repeats sending the request to the data conversion apparatus 200 with the inquiring time interval set in the control information 80D, "300 (sec)", for example. When there is no response from the data conversion apparatus 200 more than the response time limit set in the control information 80D, "60 (sec)", for example, the print data obtaining unit 32 performs the predetermined error operation (for example, sending an error notice to the data processing apparatus 100 which has sent the print request data PRD) and ends the operation of sending the request.

(Operation by Data Conversion Apparatus 200)

When the data conversion unit 22 of the data conversion apparatus 200 completes the conversion of the application data to the print data, the data conversion unit 22 stores the print data in the predetermined storage area (step S205). At this time, the data conversion unit 22 records the access path to the stored converted print data for the item "access path" of the management information 90D. Further, the data conversion unit 22 updates the status of the conversion for the item "status" of the management information 90D to "converted (completed)".

(Operation by Image Processing Apparatus 300)

At this time, when the print data obtaining unit 32 of the image processing apparatus 300 sends the request of sending print data to the data conversion apparatus 200 identified by the converting apparatus data (step S4021), the converted print data is sent from the data conversion apparatus 200 (step S4022).

With this operation, the print data obtaining unit 32 ends sending the request of sending print data, and indicates the print control unit 33 to print the obtained print data (step S303). At this time, the print data obtaining unit 32 outputs the received print data to the print control unit 33.

Then, the print control unit 33 outputs the print data to the plotter (not shown in the drawings) included in the image processing apparatus 300, and performs printing in accordance with a predetermined printing condition (step S304).

As described above, according to the print control system 1 of the embodiment, the data processing apparatus 100 requests obtaining the print data and printing the obtained print data to the image processing apparatus 300 selected to print as well as requesting the converting of the application data to the print data to the data conversion apparatus 200.

Thus, the print control system 1 of the embodiment is capable of providing an environment in which the image processing apparatus 300 selected to print dynamically obtains the print data from the data conversion apparatus 200 to print the print data.

Therefore, according to the print control system 1 of the embodiment, the data conversion request unit 11 of the data processing apparatus 100 connected to the internal network N sends the conversion request data TRD including the application data to be processed to the data conversion apparatus 200 connected to the external network I for requesting the converting of the application data to print data. Then, the data conversion unit 22 of the data conversion apparatus 200 converts the received application data to the print data.

Further, the print request unit 13 of the data processing apparatus 100 sends the print request data PRD including the converting apparatus data to the image processing apparatus 300 selected to print connected to the internal network N for requesting the printing. Then, the image processing apparatus 300 sends a request of sending the print data to the data conversion apparatus 200 selected to convert by the print data obtaining unit 32 and prints the obtained print data by the print control unit 33.

With this, the print control system 1 of the embodiment is capable of providing an environment in which the image processing apparatus 300 selected to print dynamically obtains the print data from the data conversion apparatus 200, and prints the obtained print data. Thus, it is possible to perform a pseudo-push type printing using the data conversion apparatus 200 connected to the external network I.

(Alternative Example)

In the above embodiment, the data conversion apparatus 200 is configured to perform a data conversion of the application data to be processed received from the data processing apparatus 100 in a received order.

In this example, the data processing apparatus 100 sends a request of converting application data to print data in which the order of data conversion is indicated, to the data conversion apparatus 200.

With this, according to the example, an environment in which the order of data conversion is controlled can be provided.

It is to be noted that, in the explanation of the drawings, the same components are given the same reference numerals, and explanations are not repeated.

(Print Control Function)

In this example, functions of the data conversion request unit 11 of the data processing apparatus 100 and the data conversion unit 22 of the data conversion apparatus 200 are different from those of the above embodiment.

(Data Processing Apparatus 100)

The data conversion request unit 11 sends the conversion request data TRD as shown in FIG. 10, for example, to the data conversion apparatus 200 for requesting a conversion of the application data to be processed to print data.

FIG. 10 is a view showing another example of the conversion request data TRD.

As shown in FIG. 10, the conversion request data TRD includes data corresponding to an item "priority" in addition to the conversion format data, the job ID data, the printer ID data or the like.

Data corresponding to the item "priority" (hereinafter simply referred to as "priority data") indicates a priority value by which the order of conversion is determined. The priority data may be a stepwise value indicating priority such as one of 1 to 5, for example. The priority data may be selected by the user via an operation panel.

The data conversion request unit 11 displays an operation panel capable of inputting or selecting the priority data, generates the conversion request data TRD including the application data based on the priority data input or selected via the operation panel, and sends the conversion request data TRD to the data conversion apparatus 200.

With this, the data processing apparatus 100 of the embodiment sends the request of converting application data to print data in which the order of data conversion is indicated, to the data conversion apparatus 200.

(Data Conversion Apparatus 200)

Figure 11:
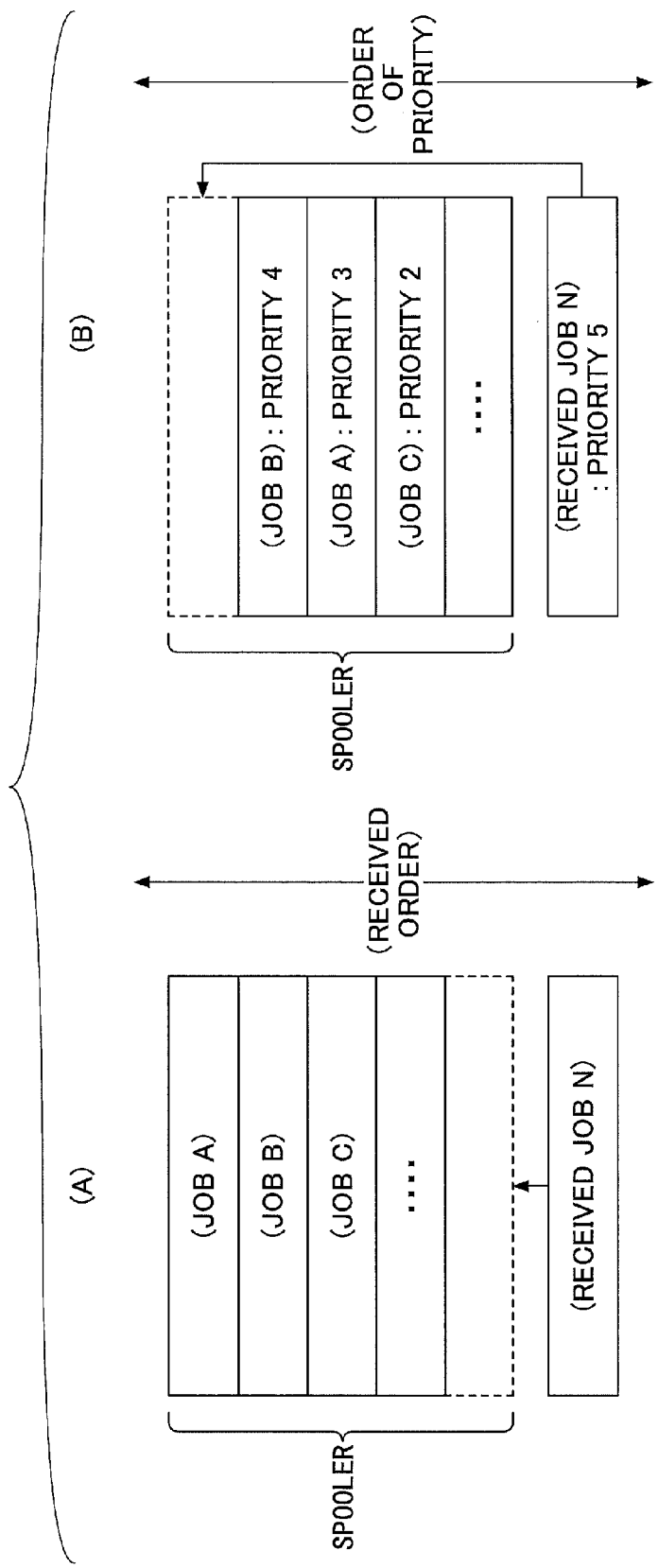
FIG. 11 is a view showing an example of a spooling operation of the example.

When the data conversion request receiving unit 21 receives the request of converting application data to print data, the data conversion unit 22 controls a spooling operation in a data conversion as shown in FIG. 11, for example.

FIG. 11 is a view showing an example of the spooling operation of the example. (A) of FIG. 11 shows an example of the spooling operation in accordance with a received order. (B) of FIG. 11 shows a spooling operation in accordance with an order of priority.

As shown in (A), in the above embodiment, when the data conversion request receiving unit 21 receives the application data to be processed from the data processing apparatus 100, the received application data to be processed are stored in a spooler in the received order and then, the application data to be processed are converted to corresponding print data in the stored order. Thus, the data conversion unit 22 performs the data conversion in accordance with "First In First Out (FIFO)".

In this example, as shown in (B), when the data conversion apparatus 200 receives the application data to be processed from the data processing apparatus 100, the received application data to be processed are stored in the spooler in an order based on the priority data included in the conversion request data TRD. Then, the application data to be processed are converted to corresponding print data in the stored order. Thus, in this example, the received application data to be processed are sorted in the order based on the priority data included in the conversion request data TRD. As a result, the data conversion unit 22 converts the application data in an order of priority (sort order).

As described above, in the data conversion apparatus 200 of the example, the order of converting the application data to be processed is controlled in accordance with a priority.

Second Embodiment

In the print control system 1, it is necessary to uniquely set the job ID data. Thus, in this embodiment, the job ID data are managed (allocated) at the data conversion apparatus 200 side.

Thus, according to the embodiment, the data conversion apparatus 200 automatically issues job ID data when receiving the request of converting application data to print data, and sends the issued data job ID data to the processing apparatus 100.

It is to be noted that, in the explanation of the drawings, the same components are given the same reference numerals, and explanations are not repeated.

(Print Control Function)

Figure 12:
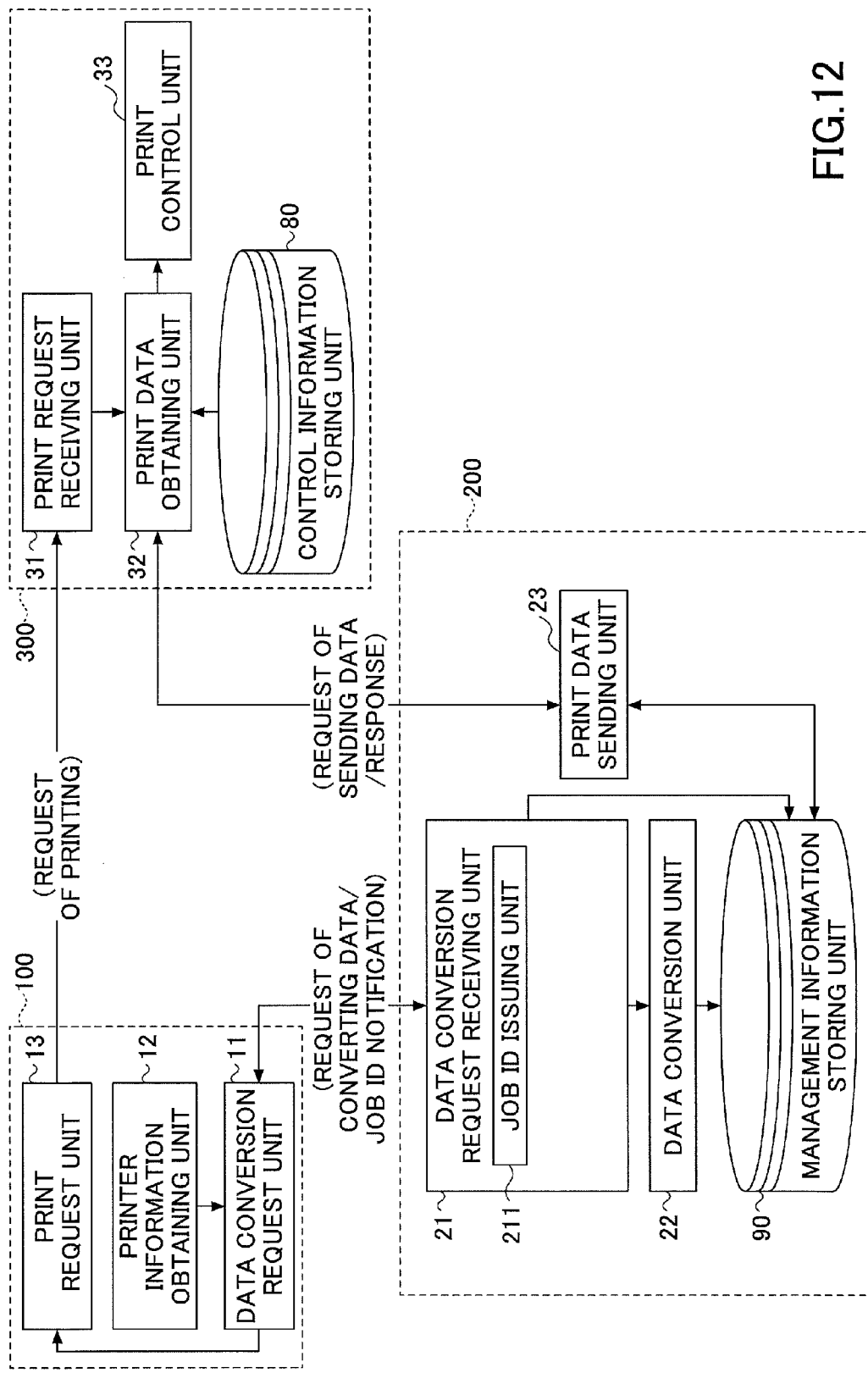
FIG. 12 is a block diagram showing an example of the print control function of the embodiment.

FIG. 12 is a block diagram showing an example of the print control function of the embodiment.

As shown in FIG. 12, in this embodiment, the data conversion unit 22 of the data conversion apparatus 200 includes a job ID issuing unit 211. Further, in this embodiment, the functions of the data conversion request unit 11 and the print request unit 13 of the data processing apparatus 100 and the data conversion unit 22 of the data conversion apparatus 200 are different from those of the first embodiment.

(Data Processing Apparatus 100 and Data Conversion Apparatus 200)

In the data processing apparatus 100, the data conversion request unit 11 sends the conversion request data TRD as shown in FIG. 13A, for example, to the data conversion apparatus 200 for requesting the converting to the print data. Then, in the data conversion apparatus 200, upon receiving the request of converting application data to print data, the data conversion request receiving unit 21 issues job ID data for the received application data to be processed and sends the issued job ID to the data processing apparatus 100 in response.

FIG. 13A is a view showing an example of the conversion request data TRD of the embodiment. As shown in FIG. 13A, the conversion request data TRD includes the conversion format data, the printer ID data or the like, but does not include the job ID data.

Referring back to FIG. 12, in the data processing apparatus 100, when a user selects application data (job) to be processed and the image processing apparatus 300 to print via the operation panel, the data conversion request unit 11 accepts the selections. At this time, the data conversion request unit 11 does not issue job ID data for the selected application data to be processed. The data conversion request unit 11 generates the conversion request data TRD including the selected application data, and sends the conversion request data TRD to the data conversion apparatus 200.

In the data conversion apparatus 200, when the data conversion request receiving unit 21 receives the request of converting application data to print data, the job ID issuing unit 211 issues unique job ID data for the application data unit 211 included in the received request of converting application data to print data.

FIG. 13B is a view showing an example of job ID notification data JRD.

As shown in FIG. 13B, the job ID notification data JRD includes the job ID data corresponding to the item "job ID". The job ID data is a value issued by the job ID issuing unit 211 of the data conversion request receiving unit 21.

Referring back to FIG. 12, the data conversion request receiving unit 21 sends the job ID notification data JRD including the job ID data issued by the job ID issuing unit 211 to the data processing apparatus 100 as a reply.

At this time, the data conversion request receiving unit 21 accesses the management information storing unit 90, and generates the data set for the received conversion request data TRD by registering the job ID data issued by the job ID issuing unit 211 and the printer ID data included in the received conversion request data TRD for the item "job ID" and the item "printer ID", respectively.

Then, in the data processing apparatus 100, the data conversion request unit 11 receives the job ID notification data JRD sent from the data conversion request receiving unit 21 of the data conversion apparatus 200, outputs the job ID data included in the job ID notification data JRD to the print request unit 13 with the converting apparatus data and indicates the print request unit 13 to send a request of obtaining the print data and printing the obtained print data.

As described above, in the print control system 1 of the embodiment, the data conversion apparatus 200 issues the job ID data when receiving the request of converting application data to print data from the data processing apparatus 100, and replies the issued job ID data to the data processing apparatus 100 which has sent the request.

As described above, the print control function of the embodiment is actualized by a combination of the components.

The operation of the print control function of the embodiment is explained in detail with respect to a sequence diagram.

Figure 14:
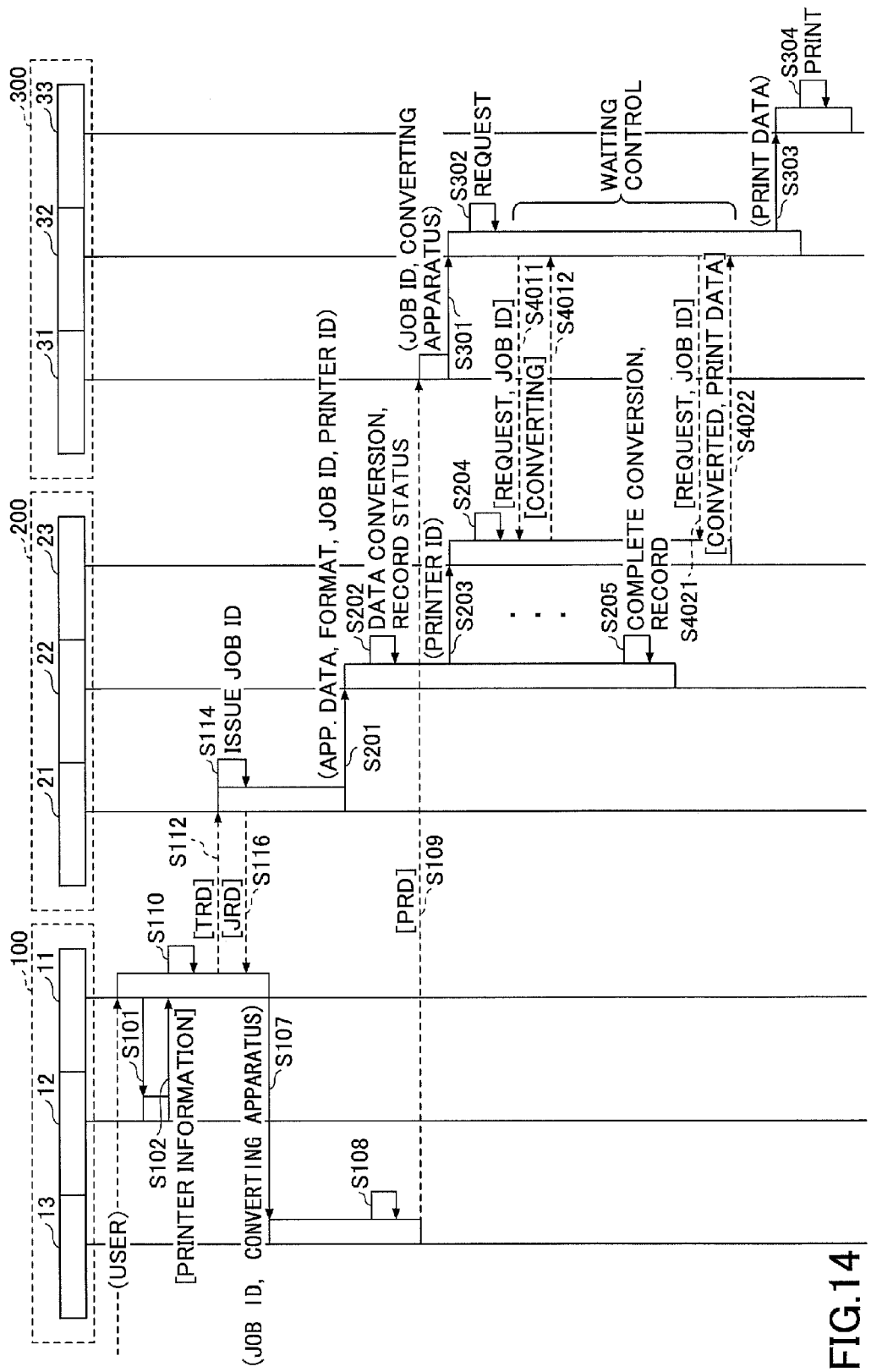
FIG. 14 is a sequence diagram showing an example of an operation of print control of the embodiment.

FIG. 14 is a sequence diagram showing an example of an operation of print control of the embodiment. For the operation shown in FIG. 14, processes after step S201 and processes after step S301 are the same as those shown in FIG. 9, and thus the explanation is not repeated. Only steps S101 to S114 which are different from those shown in FIG. 9 are explained.

(Operation by Data Processing Apparatus 100)

As shown in FIG. 14, upon an instruction from the user, the data conversion request unit 11 of the data processing apparatus 100 displays an operation panel and accepts selections of application data to be processed and the image processing apparatus 300 to print the selected application data. Then, the data conversion request unit 11 indicates the printer information obtaining unit 12 to obtain the printer information of the selected image processing apparatus 300 (step S101). When the printer information obtaining unit 12 obtains the printer information, the data conversion request unit 11 refers to the printer information obtained by the printer information obtaining unit 12 (step S102).

Then, the data conversion request unit 11 generates the conversion request data TRD including the selected application data, and the conversion format data and the printer ID data obtained from the printer information of the selected image processing apparatus 300 (step S110). At this time, the data conversion request unit 11 does not issue the job ID data and the conversion request data TRD does not include the job ID data. The data conversion request unit 11 sends the conversion request data TRD for requesting the converting of application data to print data to the data conversion apparatus 200 (step S112).

(Operation by Data Conversion Apparatus 200)

When the data conversion apparatus 200 receives the request of converting application data to print data from the data processing apparatus 100, the data conversion request receiving unit 21 indicates the job ID issuing unit 211 to issue job ID data for the application data included in the received conversion request data TRD (step S114). The data conversion request receiving unit 21 generates the job ID notification data JRD including the issued job ID data, and sends the generated job ID notification data JRD to the data processing apparatus 100 (step S116).

Subsequently, the data conversion request receiving unit 21 indicates the data conversion unit 22 to convert the received application data to print data (step S201). Then, the data conversion unit 22 converts the application data to the print data.

(Operation by Data Processing Apparatus 100)

In the data processing apparatus 100, when the job ID notification data JRD is sent from the data conversion apparatus 200, the data conversion request unit 11 indicates the print request unit 13 to send a request of printing (step S107). At this time, the data conversion request unit 11 outputs the received job ID data and the converting apparatus data to the print request unit 13.

Then, the print request unit 13 generates the print request data PRD including the job ID data and the converting apparatus data (step S108). The print request unit 13 sends the print request data PRD for requesting the obtaining of the print data and printing the obtained print data to the image processing apparatus 300 (step S109).

(Operation by Image Processing Apparatus 300)

When the image processing apparatus 300 receives the request of obtaining the print data and printing the obtained print data from the data processing apparatus 100, the print request receiving unit 31 indicates the print data obtaining unit 32 to send a request of sending print data (step S301). Then, the image processing apparatus 300 performs operations of obtaining the print data from the data conversion apparatus 200 and printing the obtained print data.

As described above, according to the print control system 1 of the embodiment, the data conversion request unit 11 of the data processing apparatus 100 connected to the internal network N sends the request data TRD including the application data to be processed for requesting the converting of the application data to the print data to the data conversion apparatus 200 connected to the external network I. Then, the data conversion request receiving unit 21 of the data conversion apparatus 200 issues the job ID data for the application data to be processed.

With this, in the data conversion apparatus 200, the data conversion request receiving unit 21 sends the job ID notification data JRD including the issued job ID data to the data processing apparatus 100. Subsequently, in the data conversion apparatus 200, the data conversion unit 22 converts the received application data to the print data. The print data is corresponded with the job ID data.

In the data processing apparatus 100, when the data conversion apparatus 200 sends the job ID notification data JRD, the print request unit 13 sends the print request data PRD including the job ID data issued by the data conversion apparatus 200 and the converting apparatus data to the image processing apparatus 300 selected to print connected to the internal network N. With this, in the image processing apparatus 300, the print data obtaining unit 32 sends a request of sending the print data to the conversion apparatus 200 selected to convert based on the converting apparatus data and the job ID data, and the print control unit 33 prints the obtained print data.

With this, in the print control system 1 of the embodiment, similar to the first embodiment, it is possible to perform a pseudo-push type printing using the data conversion apparatus 200 connected to the external network I.

(Alternative Example)

The conversion request data TRD sent from the data processing apparatus 100 to the data conversion apparatus 200 may potentially not include the conversion format data, in addition to the job ID data. In such a case, the conversion request data TRD may include only the printer ID data in addition to the application data. In this case, the processes are as follows.

When the data conversion apparatus 200 receives the conversion request data TRD from the data processing apparatus 100, the data conversion request receiving unit 21 indicates the data conversion unit 22 to convert the received application data to print data. Then, upon receiving the received application data, the printer ID data, and the issued job ID data from the data conversion request receiving unit 21, the data conversion unit 22 enters a wait state for the data conversion.

In the image processing apparatus 300, upon receiving the print request data PRD from the data processing apparatus 100, the print request receiving unit 31 sends the conversion format data such as the PDL identifier adaptable for the image processing apparatus 300, to the data conversion request receiving unit 21 of the data conversion apparatus 200.

When the data conversion apparatus 200 receives the conversion format data from the image processing apparatus 300, the data conversion request receiving unit 21 outputs the received conversion format data to the data conversion unit 22. Then, the data conversion unit 22 starts converting the application data based on the received conversion format data.

As described above, in this example, the same merits can be obtained by a different method as the print control function of the embodiment.

Third Embodiment

In the above embodiment, the image processing apparatus 300 is configured to repeat sending the request of sending print data after a predetermined period when the status information is sent to the image processing apparatus 300 from the data conversion apparatus 200 until the print data is sent. At this time, data are periodically sent and received between the image processing apparatus 300 and the data conversion apparatus 200. Thus, if there are a large number of image processing apparatuses 300 which send the request to the data conversion apparatus 200 exists, for example, a load of a data communication process becomes large to cause a delay in printing.

Thus, in this embodiment, the data conversion apparatus 200 is configured to predict time necessary to convert the application data to be processed to print data when receiving the request of converting application data to print data and send the predicted time to the data processing apparatus 100. With this, in this embodiment, an environment in which the load of a data communication process between the image processing apparatus 300 and the data conversion apparatus 200 is reduced can be provided.

It is to be noted that, in the explanation of the drawings, the same components are given the same reference numerals, and explanations are not repeated.
(Print Control Function)

Figure 15:
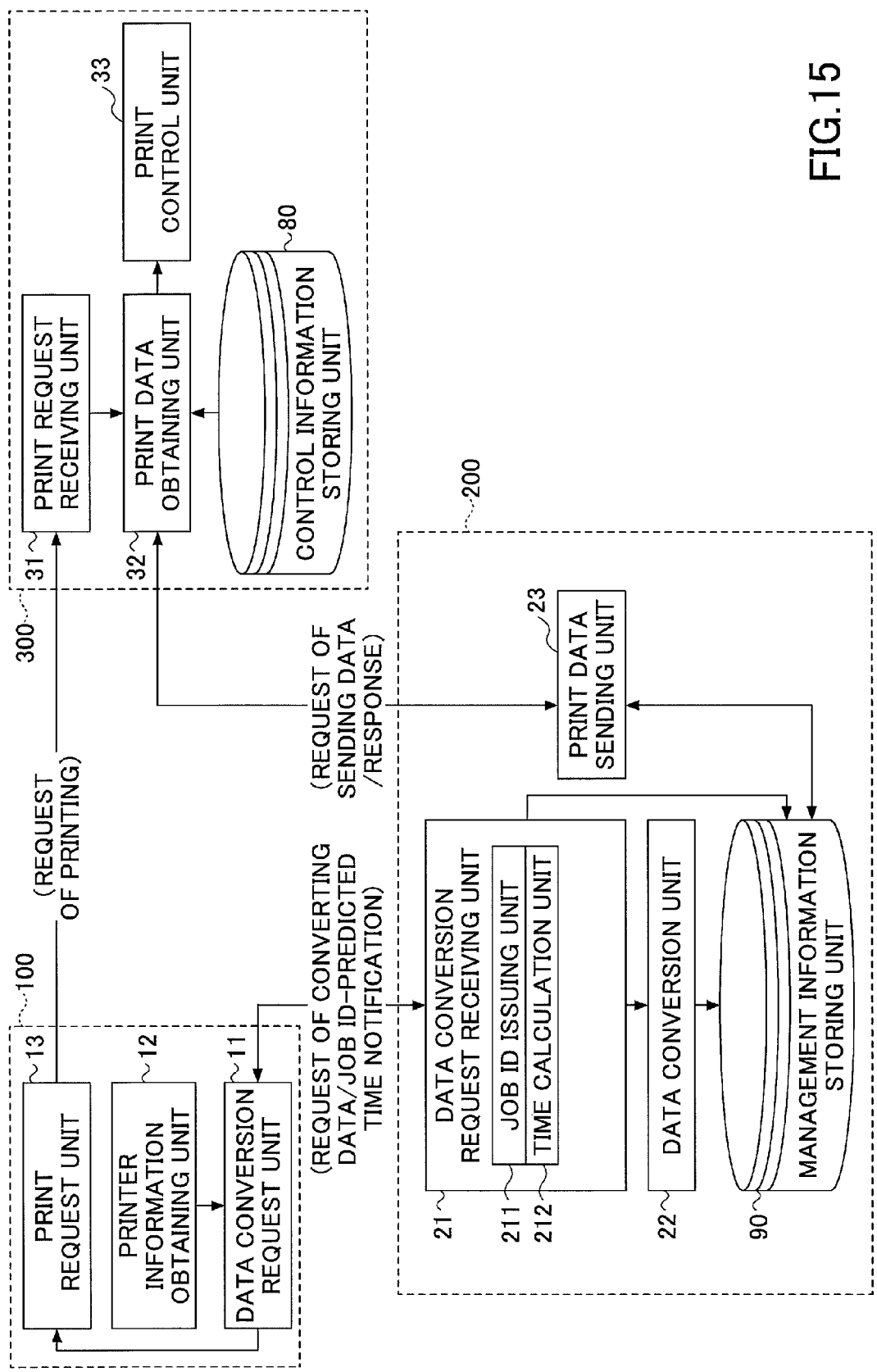
FIG. 15 is a block diagram showing an example of the print control function of the embodiment.

FIG. 15 is a block diagram showing an example of the print control function of the embodiment.

As shown in FIG. 15, in this embodiment, the data conversion unit 22 of the data conversion apparatus 200 further includes a time calculation unit 212 in addition to the job ID issuing unit 211 shown in FIG. 12 of the second embodiment. Further, in this embodiment, the functions of the data conversion request unit 11 and the print request unit 13 of the data processing apparatus 100, the data conversion unit 22 of the data conversion apparatus 200, and the print data obtaining unit 32 of the image processing apparatus 300 are different from those of the second embodiment.
(Data Processing Apparatus 100 and Data Conversion Apparatus 200)

In the data processing apparatus 100, the data conversion request unit 11 sends the conversion request data TRD as shown in FIG. 16A, for example, to the data conversion apparatus 200 for requesting the converting to the print data. Then, in the conversion apparatus 200, upon receiving the request of converting application data to print data, the data conversion request receiving unit 21 issues job ID data by the job ID issuing unit 211 and predicts time necessary for converting the application data to be processed to print data by the time calculation unit 212. Subsequently, the data conversion request receiving unit 21 sends the issued job ID data and the predicted time to the data processing apparatus 100 in response.

FIG. 16A is a view showing an example of conversion request data TRD of the embodiment. As shown in FIG. 16A, the conversion request data TRD includes data corresponding to an item such as "size", which indicates size of the application data to be processed, in addition to the conversion format data and the printer ID data.

Data corresponding to the item "size" (hereinafter simply referred to "size data") indicates the size of the application data to be processed. The size data may be a data size value or a file size value (hereinafter simply referred to as a "data size value") capable of being obtained from a property or the like of the application data.

Referring back to FIG. 15, in the data processing apparatus 100, when a user selects application data (job) to be processed and the image processing apparatus 300 to print via the operation panel, the data conversion request unit 11 accepts the selections. At this time, the data conversion request unit 11 obtains the size data from the property or the like of the selected application data. Then, the data conversion request unit 11 generates the conversion request data TRD including the selected application data, the conversion format data, the printer ID data and the data size value, and sends the conversion request data TRD to the data conversion apparatus 200.

In the data conversion apparatus 200, when the data conversion request receiving unit 21 receives the request of converting application data to print data, the time calculation unit 212 calculates time necessary for converting the received application data to print data of the set conversion format based on the received conversion format data and the size data.

FIG. 16B is a view showing an example of job ID-predicted time notification data JTRD.

Data corresponding to the item "predicted time" (hereinafter referred to as "predicted time data") indicates a value of predicted time necessary for converting the application data to be processed to print data. The predicted time data is predicted (calculated) by the time calculation unit 212 of the data conversion request receiving unit 21.

As shown in FIG. 16B, the job ID-predicted time notification data JTRD includes the job ID data and the predicted time data. The job ID data is issued by the job ID issuing unit 211 of the data conversion request receiving unit 21.

FIG. 17 is a view showing an example of calculation data 212D for calculating the predicted time.

When calculating the predicted time, the time calculation unit 212 may refer to the calculation data 212D shown in FIG. 17, for example, and calculates the predicted time in accordance with a method of calculation previously set for each of the conversion format data.

As shown in FIG. 17, the calculation data 212D includes one or more data sets in each of which the conversion format data and the method of calculation corresponding with each other. The data set is prepared for each of the conversion format data.

The item "conversion format" indicates the conversion format data, and may be PDL identifier or the like. The item "method of calculation" indicates the method of calculation of the predicted time. For the data corresponding to the item "method of calculation" may be a formula for calculating the predicted time by inputting size data as a parameter value.

The conversion format data are previously set based on the conversion formats adaptable for the data conversion apparatus 200. For the method of calculation, formulas may be obtained by actually converting application data of various data size to print data of various conversion formats by the data conversion apparatus 200. For the formulas shown in FIG. 17, "x" expresses the data size of original data and "y" expresses the predicted time necessary for converting the application data to print data.

Referring back to FIG. 15, in the data conversion apparatus 200, the time calculation unit 212 refers to the calculation data 212D and specifies the "method of calculation" corresponding to the conversion format data which is the same as the received conversion format data. The time calculation unit 212 inputs the size data as the parameter value of the specified "method of calculation" and calculates the predicted time necessary for converting the received application data to the print data of the specified conversion format. Further, the time calculation unit 212 adds the calculated predicted time to a receiving time of the application data (receiving time of the request of converting application data to print data) and sets the added value as the predicted time data.

Then, the data conversion request receiving unit 21 sends the job ID-predicted time notification data JTRD including the job ID data issued by the job ID issuing unit 211 and the predicted time data calculated by the time calculation unit 212 to the data processing apparatus 100 in response.

Then, in the data processing apparatus 100, the data conversion request unit 11 outputs the job ID data and the predicted time data of the job ID-predicted time notification data JTRD received from the data conversion request receiving unit 21 of the data conversion apparatus 200 to the print request unit 13 with the converting apparatus data to indicate to send a request of obtaining the print data and printing the obtained print data.

As described above, in the print control system 1 of the embodiment, upon receiving the request of converting application data to print data from the data processing apparatus 100, the data conversion apparatus 200 is configured to automatically issue job ID data for the application data included in the request, calculate predicted time data, and reply to the data processing apparatus 100 which has sent the request.

Further, in this embodiment, the time calculation unit 212 is configured to include the calculation data 212D (the method of calculation is included in the software for actualizing the time calculation function). However, alternatively, the calculation data 212D may be stored in a predetermined storage area as external data, and the time calculation unit 212 may access and refer to the calculation data 212D stored in the predetermined storage area.

(Image Processing Apparatus 300)

The print request unit 13 of the data processing apparatus 100 sends the print request data PRD as shown in FIG. 18 to the image processing apparatus 300, for example.

FIG. 18 is a view showing an example of the print request data PRD of the embodiment.

As shown in FIG. 18, the print request data PRD includes the predicted time data in addition to the job ID data and the converting apparatus data.

Referring back to FIG. 15, the print request receiving unit 31 outputs the job ID data, the converting apparatus data, and the predicted time data included in the received print request data PRD to the print data obtaining unit 32 and indicates the print data obtaining unit 32 to send a request of sending print data.

Then, the print data obtaining unit 32 sends the request of sending print data to the data conversion apparatus 200 based on the predicted time data. Specifically, the print data obtaining unit 32 accesses the data conversion apparatus 200 after the time defined by the predicted time data has passed and sends the request command of sending print data including the job ID data.

As described above, in the print control system 1 of the embodiment, the data processing apparatus 100 sends the print request data PRD including the predicted time data for the application data to be processed to the image processing apparatus 300. Then, the image processing apparatus 300 controls the timing of obtaining the print data from the data conversion apparatus 200 based on the received predicted time data. Thus, according to the print control system 1 of the embodiment, as the image processing apparatus 300 obtains the print data at an appropriate timing after the application data to be processed is converted from the data conversion apparatus 200, the load of a data communication process between the apparatuses can be reduced.

It is to be noted that, in the explanation of the drawings, the same components are given the same reference numerals, and explanations are not repeated.

The operation of the print control function of the embodiment is explained in detail with respect to a sequence diagram.

Figure 19:
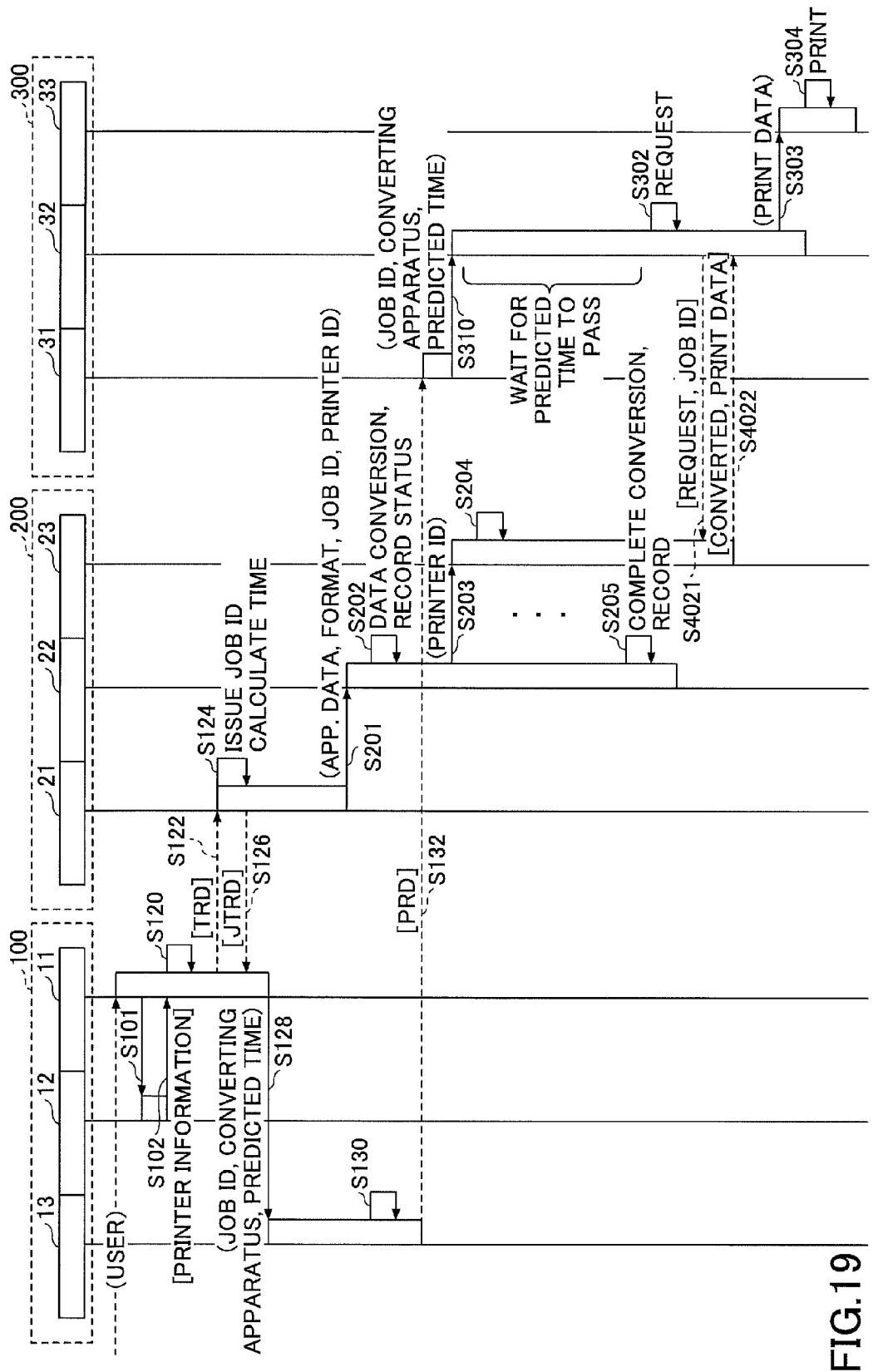
FIG. 19 is a sequence diagram showing an example of an operation of print control of the embodiment.

FIG. 19 is a sequence diagram showing an example of an operation of print control of the embodiment.

(Operation by Data Processing Apparatus 100)

Upon an instruction from the user, the data conversion request unit 11 of the data processing apparatus 100 displays an operation panel and accepts selections of application data to be processed and the image processing apparatus 300 to print the selected application data. Then, the data conversion request unit 11 indicates the printer information obtaining unit 12 to obtain the printer information of the selected image processing apparatus 300 (step S101). Then, the data conversion request unit 11 refers to the printer information obtained by the printer information obtaining unit 12 (step S102).

Subsequently, the data conversion request unit 11 generates the conversion request data TRD including the selected application data, the size data of the application data obtained from the property or the like of the application data, and the conversion format data and the printer ID data obtained from the printer information (step S120). The data conversion request unit 11 sends the generated conversion request data TRD to the data conversion apparatus 200 for requesting the converting of the application data to print data (step S122).

(Operation by Data Conversion Apparatus 200)

When the data conversion apparatus 200 receives the request of converting application data to print data from the data processing apparatus 100, the data conversion request receiving unit 21 indicates the job ID issuing unit 211 to issue job ID data for the application data included in the received conversion request data TRD. Further, the data conversion request receiving unit 21 indicates the time calculation unit 212 to calculate the predicted time necessary for converting the received application data to the print data of the set conversion format based on the conversion format data and the size data of the received conversion request data TRD (step S124). At this time, the time calculation unit 212 refers to the calculation data 212D, inputs the size data as the parameter value of the formula corresponding to the set conversion format to obtain the predicted time. Further, the time calculation unit 212 adds the calculated predicted time to a receiving time of the request of converting application data to print data to generate the predicted time data.

The data conversion request receiving unit 21 generates the job ID-predicted time notification data JTRD including the issued job ID data and the calculated predicted time data, and sends the generated job ID-predicted time notification data JTRD to the data processing apparatus 100 as a reply (step S126).

(Operation by Data Processing Apparatus 100)

In the data processing apparatus 100, when the job ID-predicted time notification data JTRD is sent from the data conversion apparatus 200, the data conversion request unit 11 indicates the print request unit 13 to send a request of printing (step S128). At this time, the data conversion request unit 11 outputs the job ID data and the predicted time data of the received job ID-predicted time notification data JTRD and the converting apparatus data to the print request unit 13.

Then, the print request unit 13 generates the print request data PRD including the job ID data, the converting apparatus data, and the predicted time data (step S130). The print request unit 13 sends the generated print request data PRD for requesting the obtaining of the print data and printing the obtained print data to the image processing apparatus 300 (step S132).

(Operation by Data Conversion Apparatus 200)

Referring back to the explanation of the data conversion apparatus 200, when the data conversion apparatus 200 receives the request of converting application data to print data from the data processing apparatus 100, the data conversion request receiving unit 21 indicates the data conversion unit 22 to convert the received application data to print data (step S201). At this time, the data conversion request receiving unit 21 accesses the management information storing unit 90, records the issued job ID data and the printer ID data included in the received conversion request data TRD, and generates a data set of the management information 90D for the received request of converting application data to print data.

Then, the data conversion request receiving unit 21 outputs the issued job ID data, the application data included in the conversion request data TRD, the conversion format data, and the printer ID data to the data conversion unit 22.

Then, the data conversion unit 22 starts converting the application data to the print data (step S202). At this time, the data conversion unit 22 converts the application data to print data of the conversion format specified by the conversion format data. Meanwhile, the data conversion unit 22 records the status of the conversion "start conversion" or "converting" for the item "status" in the data set of the management information 90D generated by the data conversion request receiving unit 21. The data conversion unit 22 may periodically update the status of the conversion in accordance with the operation.

The data conversion unit 22 indicates the print data sending unit 23 to wait for a request of sending print data from the image processing apparatus 300 (step S203). At this time, the data conversion unit 22 outputs the printer ID data to the print data sending unit 23.

Then, the print data sending unit 23 starts waiting for the request of sending print data from the image processing apparatus 300 identified by the printer ID data (step S204).

The print data sending unit 23 enters a wait state for the request of sending print data image from the processing apparatus 300.

When the data conversion unit 22 of the data conversion apparatus 200 completes the conversion of the application data to the print data, the data conversion unit 22 stores the print data in the predetermined storage area (step S205). At this time, the data conversion unit 22 records the access path to the stored converted print data for the item "access path" of the management information 90D. Further, the data conversion unit 22 updates the status of the conversion for the item "status" of the management information 90D to "converted (completed)".

When the print data sending unit 23 receives the request of sending print data from the identified image processing apparatus 300 after the predicted time has passed, the print data sending unit 23 accesses the management information storing unit 90, and refers to the status information of the management information 90D specified by the received job ID data. As the status information of the management information 90D is "converted (completed)" at this time, the print data sending unit 23 obtains the converted print data based on the access path data, and sends the converted print data to the corresponding image processing apparatus 300 in response.

(Operation by Image Processing Apparatus 300)

When the image processing apparatus 300 receives the request of obtaining the print data and printing the obtained print data from the data processing apparatus 100, the print request receiving unit 31 indicates the print data obtaining unit 32 to send a request of sending print data (step S310). At this time, the print request receiving unit 31 outputs the job ID data, the converting apparatus data and the predicted time data included in the received print request data PRD to the print data obtaining unit 32.

Then, the print data obtaining unit 32 starts sending the request of sending print data to the data conversion apparatus 200 based on the predicted time data (step S302). Specifically, the print data obtaining unit 32 starts sending the request of sending print data after the predicted time of the predicted time data has passed. At this time, the print data obtaining unit 32 accesses the data conversion apparatus 200 identified by the converting apparatus data, and sends the request of sending print data by sending a request command of sending print data of the application data to be processed including the job ID data (step S4021). At this time, when the application data identified by the job ID data is converted to the print data by the data conversion apparatus 200, the converted print data is sent to the print data obtaining unit 32 (step S4022).

With this operation, the print data obtaining unit 32 ends sending the request of sending print data, and indicates the print control unit 33 to print the obtained print data (step S303). At this time, the print data obtaining unit 32 outputs the received print data to the print control unit 33.

Then, the print control unit 33 outputs the print data to the plotter (not shown in the drawings) included in the image processing apparatus 300, and performs printing in accordance with a predetermined printing condition (step S304).

As described above, according to the print control system 1 of the embodiment, in the data processing apparatus 100 connected to the internal network N, the data conversion request unit 11 sends the request data TRD including the application data to be processed to the data conversion apparatus 200 connected to the external network I for requesting a conversion of the application data to print data.

Then, in the data conversion apparatus 200, the data conversion request receiving unit 21 issues job ID data for the application data to be processed. Further, in the data conversion apparatus 200, the data conversion request receiving unit 21 calculates the predicted time data indicating the predicted time necessary for converting the application data to be processed to print data.

Then, in the data conversion apparatus 200, the data conversion request receiving unit 21 sends the job ID-predicted time notification data JTRD including the issued job ID data and the calculated predicted time data to the data processing apparatus 100 in response. Thereafter, in the data conversion apparatus 200, the data conversion unit 22 converts the received application data to print data.

Further, when the data processing apparatus 100 receives a response from the data conversion apparatus 200, the print request unit 13 sends the request data PRD including the converting apparatus data, and the issued job ID data and the calculated predicted time data by the data conversion apparatus 200 to the image processing apparatus 300 selected to print connected to the internal network N for requesting the printing.

Then, in the image processing apparatus 300, the print data obtaining unit 32 requests sending the print data based on the job ID data in accordance with a controlled timing after the predicted time has passed based on the predicted time data to the data conversion apparatus 200 selected to convert. Then, the print control unit 33 prints the obtained print data.

With this, the print control system 1 of the embodiment can provide an environment in which the load of a data communication process between the image processing apparatus 300 and the data conversion apparatus 200 is reduced to perform a pseudo-push type printing using the data conversion apparatus 200 connected to the external network I.

Fourth Embodiment

In the print control system 1, the data conversion apparatus 200 may convert application data to print data using a conversion format for which conversion time is short when considering a speed of a printing operation.

Thus, in this embodiment, the data conversion apparatus 200 is configured to predict a time necessary for converting application data to print data of each of conversion formats adaptable for the image processing apparatus 300 selected to print when receiving a request of converting application data to print data. Then, the data conversion apparatus 200 is configured to determine the conversion format for which the predicted time is the shortest to be the conversion format of print data converted from the application data to be processed. With this, in this embodiment, a printing environment which is convenient and with a high-speed can be provided.

It is to be noted that, in the explanation of the drawings, the same components are given the same reference numerals, and explanations are not repeated.

(Print Control Function)

Figure 20:
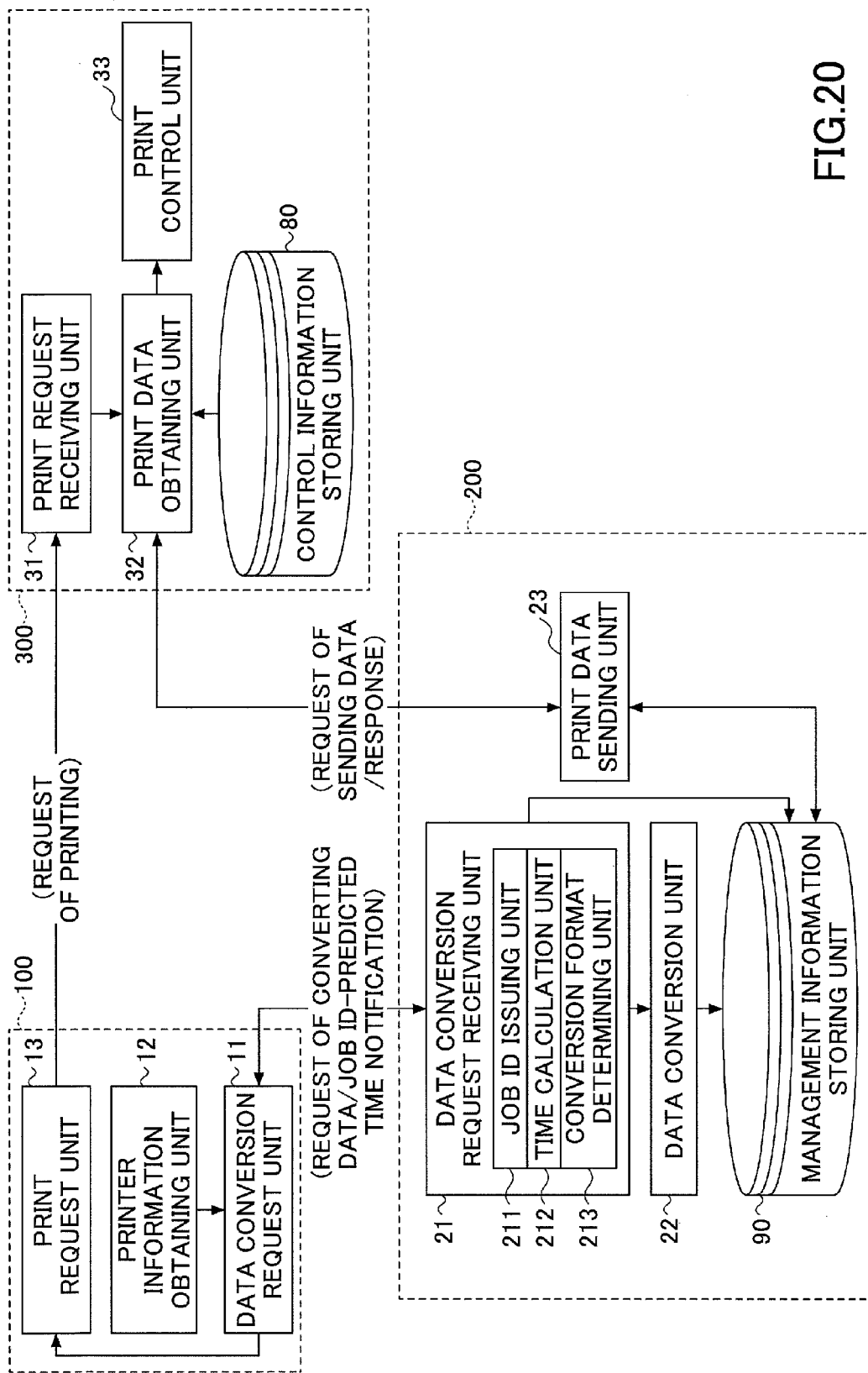
FIG. 20 is a block diagram showing an example of the print control function of the embodiment.

FIG. 20 is a block diagram showing an example of the print control function of the embodiment.

As shown in FIG. 20, in this embodiment, the data conversion unit 22 of the data conversion apparatus 200 further includes a conversion format determining unit 213 in addition to the job ID issuing unit 211 and the time calculation unit 212 shown in FIG. 15 of the third embodiment. Further, in this embodiment, the functions of the data conversion request unit 11 and the print request unit 13 of the data processing apparatus 100, and the data conversion unit 22 of the data conversion apparatus 200 are different from those of the second embodiment.

(Data Processing Apparatus 100 and Data Conversion Apparatus 200)

In the data processing apparatus 100, the data conversion request unit 11 sends the conversion request data TRD to the data conversion apparatus 200 for requesting a conversion to the print data. At this time, the conversion request data TRD sent from the data conversion request unit 11 to the data conversion apparatus 200 includes the printer ID data, the size data or the like, but does not include the conversion format data.

In the data conversion apparatus 200, when the data conversion request receiving unit 21 receives the request of converting application data to print data, the data conversion request receiving unit 21 sends the job ID issued for the received application data to be processed and the predicted time necessary for converting the application data to be processed to the data processing apparatus 100 in response.

At this time, the time calculation unit 212 of the data conversion request receiving unit 21 refers to the calculation data 212D, and calculates predicted times necessary for converting the received application data to print data for all of the conversion formats in accordance with the predetermined methods of calculation based on the received size data. In other words, the time calculation unit 212 calculates the predicted times for all of the conversion formats which are capable of being printed by the image processing apparatus 300 to print. Specifically, for example, when the image processing apparatus 300 is capable of printing print data whose conversion format are "PCL", "PS", and "RPCS", the data conversion request receiving unit 21 calculates predicted times necessary for converting the received application data to print data of these three conversion formats in accordance with the predetermined methods for each of the conversion formats.

Then, the conversion format determining unit 213 of the data conversion request receiving unit 21 determines the conversion format to be used based on the predicted time data calculated by the time calculation unit 212. At this time, the conversion format determining unit 213 compares the calculated predicted time data and selects the conversion format by which the predicted time becomes the shortest as the conversion format to be used. In other words, the conversion format determining unit 213 determines the conversion format by which the conversion of the application data to the print data is completed the fastest as the conversion format to be used.

Then, in the data conversion apparatus 200, the data conversion request receiving unit 21 sends the job ID-predicted time notification data JTRD including the job ID data issued by the job ID issuing unit 211, the predicted time data calculated by the time calculation unit 212 and selected by the conversion format determining unit 213 to the data processing apparatus 100 in response.

Further, the data conversion request receiving unit 21 outputs the conversion format data determined by the conversion format determining unit 213 to the data conversion unit 22 with the received application data and the printer ID data and instructs to convert the application data to print data.

As described above, according to the print control system 1 of the embodiment, the data conversion apparatus 200 determines the conversion format by which the conversion time necessary for converting the application data to the print data becomes the shortest as the conversion format to be used based on the predicted time data for the conversion formats applicable for the image processing apparatus 300 to print.

It is to be noted that, in the explanation of the drawings, the same components are given the same reference numerals, and explanations are not repeated.

The operation of the print control function of the embodiment is explained in detail with respect to a sequence diagram.

Figure 21:
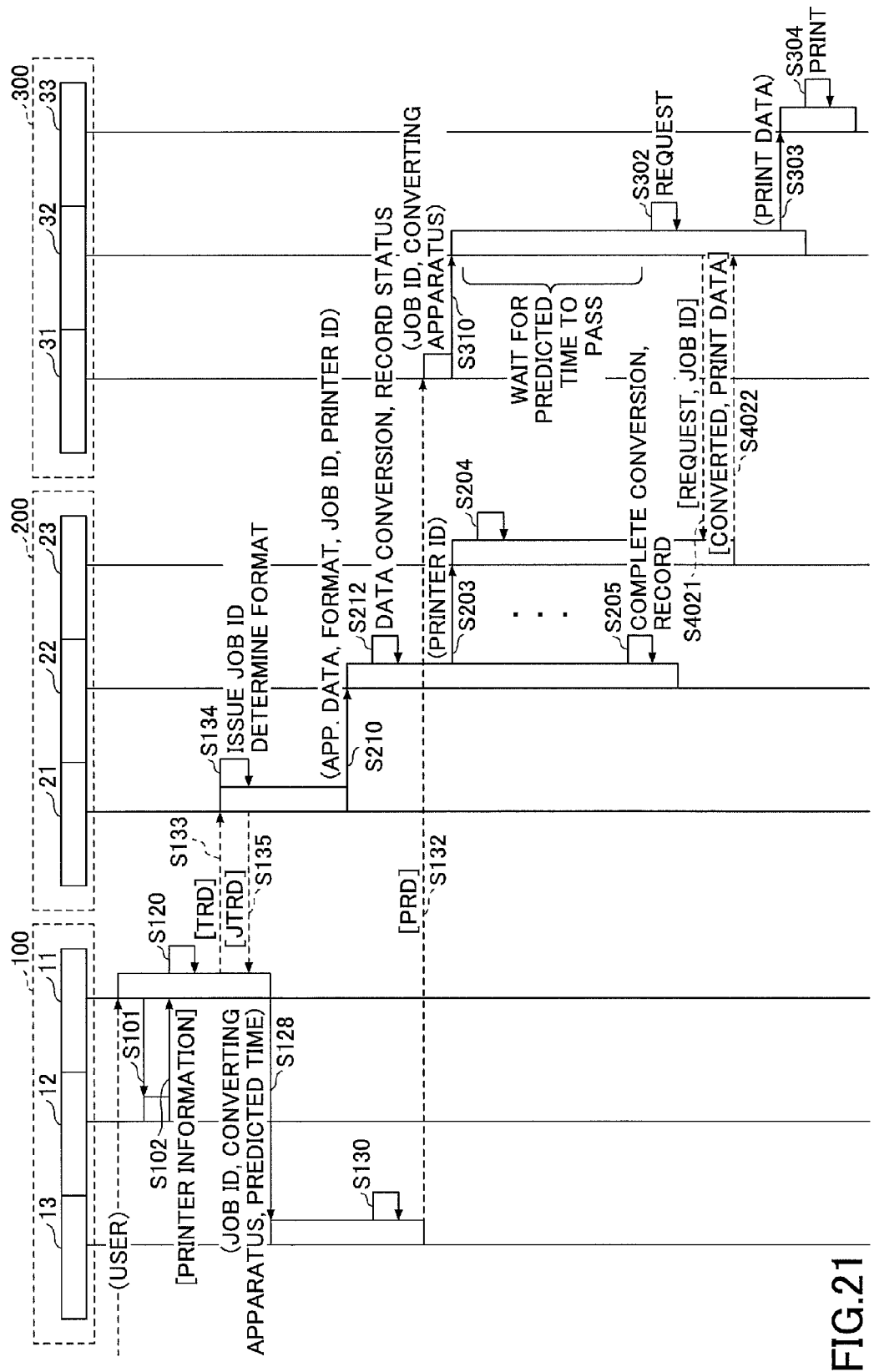
FIG. 21 is a sequence diagram showing an example of an operation of print control of the embodiment.

FIG. 21 is a sequence diagram showing an example of an operation of print control of the embodiment. For the operation shown in FIG. 21, processes from steps S101 to S120, steps S128 to S132, after step S203, and after step S310 are the same as those shown in FIG. 19, and thus the explanation is not repeated. Only steps S133 to S135, and steps S210 and S212 which are different from those shown in FIG. 19 are explained.

(Operation by Data Processing Apparatus 100)

As shown in FIG. 21, the data conversion request unit 11 of the data processing apparatus 100 sends a request of converting application data to print data with the conversion request data TRD to the data conversion apparatus 200 (step S133). At this time, as described above, the conversion request data TRD does not include the conversion format data.

(Operation by Data Conversion Apparatus 200)

When the data conversion apparatus 200 receives the request of converting application data to print data from the data processing apparatus 100, the job ID issuing unit 211 of the data conversion request receiving unit 21 issues job ID data for the received application data included in the received conversion request data TRD (step S134).

Further, in step S134, the time calculation unit 212 of the data conversion request receiving unit 21 calculates predicted times necessary for converting the received application data to print data for all of the conversion formats capable of being printed by the image processing apparatus 300 based on the size data included in the received conversion request data TRD (STEP 1 in step S134). At this time, the time calculation unit 212 refers to the calculation data 212D, inputs the data size as a parameter value for each of the formulas corresponding to the conversion formats to obtain the predicted time for each of the conversion formats, and adds the predicted times to the receiving time of the request of converting application data to print data.

Then, the conversion format determining unit 213 of the data conversion request receiving unit 21 determines the conversion format to be used based on the calculated predicted time data to be the conversion format data (STEP 2 in step S134). At this time, as described above, the conversion format determining unit 213 compares the predicted time data for each of the conversion formats, and selects the conversion format by which the predicted time is the shortest to be the conversion format to be used to be the conversion format data.

Then, the data conversion request receiving unit 21 generates the job ID-predicted time notification data JTRD including the issued job ID data and the predicted time data of the selected conversion format, and sends the generated job ID-predicted time notification data JTRD to the data processing apparatus 100 as a response (step S135).

(Operation by Data Conversion Apparatus 200)

Further, when the conversion format determining unit 213 determines the conversion format to be used, the data conversion request receiving unit 21 indicates the data conversion unit 22 to convert the received application data to the print data (step S201). At this time, the data conversion request receiving unit 21 accesses the management information storing unit 90, records the issued job ID data and the printer ID data included in the received conversion request data TRD, and generates a data set of the management information 90D for the received request of converting application data to print data. Further, the data conversion request receiving unit 21 outputs the issued job ID data, the determined conversion format data, and the application data, and the printer ID data included in the conversion request data TRD to the data conversion unit 22.

Then, the data conversion unit 22 starts converting the application data to the print data (step S202). At this time, the data conversion unit 22 converts the application data to the print data of the data format based on the determined conversion format data, by which the data conversion finished first. Meanwhile, the data conversion unit 22 records the status of the conversion "start conversion" or "converting" for the item "status" in the data set of the management information 90D generated by the data conversion request receiving unit 21. The data conversion unit 22 may periodically update the status of the conversion in accordance with the operation.

As described above, according to the print control system 1 of the embodiment, the data processing apparatus 100 connected to the internal network N sends the request data TRD including the application data to be processed by the data conversion request unit 11, to the data conversion apparatus 200 connected to the external network I for requesting the converting of the application data to print data. In response, in the data conversion apparatus 200, the data conversion request receiving unit 21 issues job ID data for the application data to be processed. Further, in the data conversion apparatus 200, the data conversion request receiving unit 21 calculates the predicted time necessary for converting the application data to be processed as the predicted time data. Further, in the data conversion apparatus 200, the data conversion request receiving unit 21 determines the conversion format by which the predicted time becomes the shortest as the conversion format to be used.

With this, in the data conversion apparatus 200, the data conversion request receiving unit 21 sends the job ID-predicted time notification data JTRD including the issued job ID data and the predicted time data of the determined conversion format to the data processing apparatus 100 in response. Thereafter, in the data conversion apparatus 200, the data conversion unit 22 converts the application data based on the conversion format data of the determined conversion format to the print data.

Further, when the data processing apparatus 100 receives the job ID data and the predicted time data of the application data to be processed from the data conversion apparatus 200, the print request unit 13 sends a request of printing to the image processing apparatus 300 selected to print connected to the internal network N by sending the print request data PRD including the issued job ID data, the predicted time data, and converting apparatus data.

In response to this, in the image processing apparatus 300, the print data obtaining unit 32 sends a request of sending the print data to the data conversion apparatus 200 selected to convert based on the job ID data in accordance with a timing controlled by the predicted time data. Then, when the print data is obtained, the print control unit 33 pints the obtained print data.

With this, according to the print control system 1 of the embodiment, a printing environment which is convenient with a high-speed can be provided. Further, the print control system 1 is capable of providing a pseudo-push type printing using the data conversion apparatus 200 connected to the external network I.

The "print control function" of the above embodiments can be actualized by executing the programs in which the above processes explained with reference to drawings are coded by programming languages in accordance with the respective operating environments (platforms) by the arithmetic units (CPU) of the apparatuses (the data processing apparatuses 100, the data conversion apparatuses 200, the image processing apparatuses 300 and the like) of the print control system 1.

The above programs may be stored in a computer readable recording medium 103a. With this, for example, for the data processing apparatus 100, the above programs may be installed in the data processing apparatus 100 via the external I/F 103. Further, as the data processing apparatus 100 includes the communication I/F 107, the above programs may be downloaded using an electrical communication line and installed.

According to the embodiments, a print control system, a method of controlling printing, a data processing apparatus, and a recording medium in which a pseudo-push type printing using a data conversion apparatus connected to an external network data conversion apparatus can be performed is provided.

The individual constituents of the print control system 1 may be embodied by arbitrary combinations of hardware and software, typified by a CPU of an arbitrary computer, memory, a program loaded in the memory so as to embody the constituents illustrated in the drawings, storage units for storing the program such as a hard disk, and an interface for network connection. It may be understood by those skilled in the art that methods and devices for the embodiment allow various modifications.

Although a preferred embodiment of the print control system 1 has been specifically illustrated and described, it is to be understood that minor modifications may be made therein without departing from the sprit and scope of the invention as defined by the claims.

The present invention is not limited to the specifically disclosed embodiments, and variations and modifications may be made without departing from the scope of the present invention.

What is claimed is:

1. An output system comprising:
a user terminal including a first processor;
an information processing system including one or more second processors; and
one or more output apparatuses each including a third processor,
wherein the first processor is configured to
receive an output request from a user, the output request designating an output target data and an output destination selected from among the one or more output apparatuses, and
send, in response to receiving the output request, the output target data to the information processing system, and an acquisition request of outputting to the designated output apparatus,
wherein the second processor is configured to
manage, in response to receiving the designated output target data from the user terminal, the output target data for outputting, and wherein the third processor is configured to
execute, in response to receiving the acquisition request from the user terminal, an acquisition process to acquire the designated output target data from the information processing system, and
output the designated output target data if the designated output target data is acquired as a result of the acquisition process,
wherein the second processor is further configured to
convert a data format of the managed output target data for outputting at the output apparatus,
determine whether the output target data has been converted or not, and
control, based on the determination, to send or not to send the converted output target data to the output apparatus as a response to the acquisition process, and
wherein the third processor is further configured to
execute the acquisition process including sending a request of the designated output data to the information processing system repeatedly when the designated output target data has not been converted at the information processing system.

2. The output system as claimed in claim 1, further comprising:
a memory to store the output target data, and
wherein one of the first processor and the second processor is further configured to issue, in response to receiving the output request, an identification information identifying the designated output target data,
wherein the first processor is further configured to send the acquisition request including the issued identification information to the designated output apparatus,
wherein the second processor is further configured to manage the output target data in association with the identification information, and
wherein the third processor is further configured to execute the acquisition process based on the identification information included in the received acquisition request.

3. The output system as claimed in claim 1, wherein the third processor is further configured to execute the acquisition process including accessing the information processing system via a firewall.

4. The output system as claimed in claim 1,
wherein the first processor is configured to send the output target data with a data conversion request to the information processing system, and the acquisition request is sent to the designated output apparatus without waiting for the output target data to be converted by the information processing system, and
wherein the second processor is configured to convert, in response to receiving the designated output target data from the user terminal, a data format of the output target data for outputting at the output apparatus.

5. The output system as claimed in claim 4,
wherein the second processor is further configured to
calculate, in response to receiving the designated output target data from the user terminal, a predicted time necessary for converting the output target data sent from the user terminal, and
send predicted time data indicating the calculated predicted time to the user terminal,
wherein the acquisition request sent by the user terminal includes the predicted time data, and
wherein the acquisition process executed by the third processor includes sending a request of sending the designated output target data converted by the second processor of the information processing system after the predicted time has passed based on the predicted time data, to the information processing system.

6. The output system as claimed in claim 1,
wherein the first processor is further configured to
issue, in response to receiving the output request, an identification information identifying the designated output target data, prior to sending the output target data to the information processing system, and the acquisition request of outputting to the designated output apparatus, and
send the output target data with the issued identification information to the information processing system, and the acquisition request with the issued identification information to the designated output apparatus,
wherein the second processor is further configured to manage the output target data in association with the identification information, and
wherein the third processor is further configured to execute the acquisition process based on the identification information sent with the received acquisition request.

7. The output system as claimed in claim 1,
wherein the first processor is further configured to send the output target data to the information processing system, prior to sending the acquisition request of outputting to the designated output apparatus,
wherein the second processor is further configured to
issue, in response to receiving the output target data from the user terminal, an identification information identifying the designated output target data, prior to converting the data format of the managed output target data,
send the issued identification information to the user terminal, and
manage the output target data in association with the identification information,
wherein the first processor is further configured to send the acquisition request with the identification information received from the information processing system to the designated output apparatus, and
wherein the third processor is further configured to execute the acquisition process based on the identification information sent with the received acquisition request.

8. A method of controlling outputting used in an output system including
a user terminal including a first processor,
an information processing system including one or more second processors, and
one or more output apparatuses each including a third processor, the method comprising:
receiving, performed at the first processor, an output request from a user, the output request designating an output target data and an output destination selected from among the one or more output apparatuses,
sending, performed at the first processor, in response to receiving the output request, the output target data to the information processing system, and an acquisition request of outputting to the designated output apparatus,
managing, performed at the second processor, in response to receiving the designated output target data from the user terminal, the output target data for outputting,
executing, performed at the third processor, in response to receiving the acquisition request from the user terminal, an acquisition process to acquire the designated output target data from the information processing system, and
outputting, performed at the third processor, the designated output target data if the designated output target data is acquired as a result of the acquisition process,
converting, performed at the second processor, a data format of the managed output target data for outputting at the output apparatus,
determining, performed at the second processor, whether the output target data has been converted or not, and
controlling, performed at the second processor, based on the determination, to send or not send the managed output target data to the output target data as a response to the acquisition process, and
wherein in the executing, performed at the third processor, the acquisition process includes sending a request of the designated output data to the information processing system repeatedly when the designated output target data has not been converted at the information processing system.

9. The method as claimed in claim 8,
wherein the output system further includes a memory to store the output target data,
the method further comprising:
issuing, performed at one of the first processor and the second processor, in response to receiving the output request, an identification information identifying the designated output target data,
wherein in the sending, performed at the first processor, the acquisition request including the issued identification information is sent to the designated output apparatus,
wherein in the managing, performed at the second processor, the output target data is managed in association with the identification information, and
wherein in the executing, performed at the third processor, the acquisition process is executed based on the identification information included in the received acquisition request.

10. The method as claimed in claim 8,
wherein in the executing, performed at the third processor, the acquisition process includes accessing the information processing system via a firewall.

11. The method of controlling outputting as claimed in claim 8,
wherein in the sending, the output target data is sent with a data conversion request to the information processing system, and the acquisition request is sent to the designated output apparatus without waiting for the output target data to be converted by the information processing system, and
the method further comprising:
converting, performed at the second processor, in response to receiving the designated output target data from the user terminal, a data format of the output target data for outputting at the output apparatus,
calculating, performed at the second processor, in response to receiving the designated output target data from the user terminal, a predicted time necessary for converting the output target data sent from the user terminal, and
sending, performed at the second processor, predicted time data indicating the calculated predicted time to the user terminal,
wherein the acquisition request sent by the user terminal includes the predicted time data, and wherein the acquisition process executed by the third processor includes sending a request of sending the designated output target data converted by the second processor of the information processing system after the predicted time has passed based on the predicted time data, to the information processing system.

12. The method as claimed in claim 8, further comprising:
issuing, performed the first processor, in response to receiving the output request, an identification information identifying the designated output target data, the identification information being issued prior to converting the data format of the managed output target data by the information processing system,
wherein in the sending, performed at the first processor, the output target data with the issued identification information is sent to the information processing system, and the acquisition request with the issued identification information is sent to the designated output apparatus,
wherein in the managing, performed at the second processor, the output target data is managed in association with the identification information, and
wherein in the executing, performed at the third processor, the acquisition process is executed based on the identification information sent with the received acquisition request.

13. The method as claimed in claim 8, further comprising:
issuing, performed at the second processor, in response to receiving the output target data from the user terminal, an identification information identifying the designated output target data, prior to converting the data format of the managed output target data,
sending, performed at the second processor, the issued identification information to the user terminal,
wherein in the sending, performed at the first processor, the acquisition request with the issued identification information is sent to the designated output apparatus,
wherein in the managing, performed at the second processor, the output target data is managed in association with the identification information, and
wherein in the executing, performed at the third processor, the acquisition process is executed based on the identification information sent with the received acquisition request.

* * * * *